(12) United States Patent
Indeck et al.

(10) Patent No.: US 8,069,102 B2
(45) Date of Patent: Nov. 29, 2011

(54) METHOD AND APPARATUS FOR PROCESSING FINANCIAL INFORMATION AT HARDWARE SPEEDS USING FPGA DEVICES

(75) Inventors: Ronald S. Indeck, St. Louis, MO (US); Ron Kaplan Cytron, St. Louis, MO (US); Mark Allen Franklin, St. Louis, MO (US); Roger D. Chamberlain, St. Louis, MO (US)

(73) Assignee: Washington University, St. Louis, MO (US)

( * ) Notice: Subject to any disclaimer, the term of this patent is extended or adjusted under 35 U.S.C. 154(b) by 718 days.

(21) Appl. No.: 11/561,615

(22) Filed: Nov. 20, 2006

(65) Prior Publication Data

US 2007/0078837 A1    Apr. 5, 2007

Related U.S. Application Data

(63) Continuation of application No. 10/153,151, filed on May 21, 2002, now Pat. No. 7,139,743.

(51) Int. Cl.
  *G06Q 40/00* (2006.01)
(52) U.S. Cl. ......................................................... 705/35
(58) Field of Classification Search ..................... 705/35, 705/36 R, 36 T, 37
See application file for complete search history.

(56) References Cited

U.S. PATENT DOCUMENTS

| | | | |
|---|---|---|---|
| 2,046,381 A | 7/1936 | Hicks et al. | |
| 3,082,402 A | 3/1963 | Scantlin | |
| 3,296,597 A | 1/1967 | Scantlin et al. | |
| 3,573,747 A | 4/1971 | Adams et al. | |
| 3,581,072 A | 5/1971 | Nymeyer et al. | |
| 3,601,808 A | 8/1971 | Vlack | |
| 3,611,314 A | 10/1971 | Pritchard et al. | |
| 3,729,712 A | 4/1973 | Glassman | |
| 3,824,375 A | 7/1974 | Gross et al. | |
| 3,848,235 A | 11/1974 | Lewis et al. | |
| 3,906,455 A | 9/1975 | Houston et al. | |
| 4,081,607 A | 3/1978 | Vitols et al. | |
| 4,298,898 A | 11/1981 | Cardot | |
| 4,314,356 A | 2/1982 | Scarbrough | |
| 4,385,393 A | 5/1983 | Chaure et al. | |
| 4,412,287 A | 10/1983 | Braddock, III | |
| 4,464,718 A | 8/1984 | Dixon et al. | |

(Continued)

FOREIGN PATENT DOCUMENTS

EP    0 851 358 A    7/1998

(Continued)

OTHER PUBLICATIONS

Anonymous, "Method for Allocating Computer Disk Space to a File of Know Size," IBM Technical Disclosure Bulletin, vol. 27, No. IOB, Mar. 1, 1985, New York.

(Continued)

*Primary Examiner* — Charles Kyle
*Assistant Examiner* — Greg Pollock
(74) *Attorney, Agent, or Firm* — Thompson Coburn LLP

(57) ABSTRACT

A method and apparatus use decision logic deployed on a reconfigurable logic device to process a stream of financial information at hardware speeds. The decision logic can be configured to perform data reduction operations on the financial information stream. Examples of such data reductions operations include data processing operations to compute a latest stock price, a minimum stock price, and a maximum stock price.

34 Claims, 24 Drawing Sheets

U.S. PATENT DOCUMENTS

| | | |
|---|---|---|
| 4,550,436 A | 10/1985 | Freeman et al. |
| 4,674,044 A | 6/1987 | Kalmus et al. |
| 4,823,306 A | 4/1989 | Barbic et al. |
| 4,903,201 A | 2/1990 | Wagner |
| 4,941,178 A | 7/1990 | Chuang |
| 5,023,910 A | 6/1991 | Thomson |
| 5,038,284 A | 8/1991 | Kramer |
| 5,050,075 A | 9/1991 | Herman et al. |
| 5,063,507 A | 11/1991 | Lindsey et al. |
| 5,077,665 A | 12/1991 | Silverman et al. |
| 5,101,353 A | 3/1992 | Lupien et al. |
| 5,101,424 A | 3/1992 | Clayton et al. |
| 5,126,936 A | 6/1992 | Champion et al. |
| 5,140,692 A | 8/1992 | Morita |
| 5,161,103 A | 11/1992 | Kosaka et al. |
| 5,163,131 A | 11/1992 | Row et al. |
| 5,179,626 A | 1/1993 | Thomson |
| 5,226,165 A | 7/1993 | Martin |
| 5,243,655 A | 9/1993 | Wang |
| 5,249,292 A | 9/1993 | Chiappa |
| 5,255,136 A | 10/1993 | Machado et al. |
| 5,258,908 A | 11/1993 | Hartheimer et al. |
| 5,265,065 A | 11/1993 | Turtle |
| 5,267,148 A | 11/1993 | Kosaka et al. |
| 5,270,922 A | 12/1993 | Higgins |
| 5,297,032 A | 3/1994 | Trojan et al. |
| 5,313,560 A | 5/1994 | Maruoka et al. |
| 5,315,634 A | 5/1994 | Tanaka et al. |
| 5,319,776 A | 6/1994 | Hile et al. |
| 5,327,521 A | 7/1994 | Savic et al. |
| 5,339,411 A | 8/1994 | Heaton, Jr. |
| 5,347,634 A | 9/1994 | Herrell et al. |
| 5,371,794 A | 12/1994 | Diffie et al. |
| 5,375,055 A | 12/1994 | Togher et al. |
| 5,388,259 A | 2/1995 | Fleischman et al. |
| 5,396,253 A | 3/1995 | Chia |
| 5,404,411 A | 4/1995 | Banton et al. |
| 5,404,488 A | 4/1995 | Kerrigan et al. |
| 5,418,951 A | 5/1995 | Damashek |
| 5,421,028 A | 5/1995 | Swanson |
| 5,432,822 A | 7/1995 | Kaewell, Jr. |
| 5,461,712 A | 10/1995 | Chelstowski et al. |
| 5,463,701 A | 10/1995 | Kantner, Jr. et al. |
| 5,465,353 A | 11/1995 | Hull et al. |
| 5,481,735 A | 1/1996 | Mortensen et al. |
| 5,488,725 A | 1/1996 | Turtle et al. |
| 5,497,317 A | 3/1996 | Hawkins et al. |
| 5,497,488 A | 3/1996 | Akizawa et al. |
| 5,500,793 A | 3/1996 | Deming, Jr. et al. |
| 5,544,352 A | 8/1996 | Egger |
| 5,546,578 A | 8/1996 | Takada |
| 5,651,125 A | 7/1997 | Witt et al. |
| 5,687,297 A | 11/1997 | Coonan et al. |
| 5,701,464 A | 12/1997 | Aucsmith |
| 5,704,060 A | 12/1997 | Del Monte |
| 5,721,898 A | 2/1998 | Beardsley et al. |
| 5,740,244 A | 4/1998 | Indeck et al. |
| 5,740,466 A | 4/1998 | Geldman et al. |
| 5,774,835 A | 6/1998 | Ozawa |
| 5,774,839 A | 6/1998 | Shlomot |
| 5,781,772 A | 7/1998 | Wilkinson, III et al. |
| 5,781,921 A | 7/1998 | Nichols |
| 5,805,832 A | 9/1998 | Brown et al. |
| 5,809,483 A | 9/1998 | Broka et al. |
| 5,813,000 A | 9/1998 | Furlani |
| 5,819,273 A | 10/1998 | Vora et al. |
| 5,819,290 A | 10/1998 | Fujita |
| 5,826,075 A | 10/1998 | Bealkowski et al. |
| 5,845,266 A | 12/1998 | Lupien et al. |
| 5,857,176 A | 1/1999 | Ginsberg |
| 5,864,738 A | 1/1999 | Kessler et al. |
| 5,870,730 A | 2/1999 | Furuya et al. |
| 5,873,071 A | 2/1999 | Ferstenberg et al. |
| 5,884,286 A | 3/1999 | Daughtery, III |
| 5,905,974 A | 5/1999 | Fraser et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Handel |
| 5,963,923 A | 10/1999 | Garber |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,016,483 A | 1/2000 | Rickard |
| 6,023,760 A | 2/2000 | Karttunen |
| 6,028,939 A | 2/2000 | Yin |
| 6,044,407 A | 3/2000 | Jones et al. |
| 6,058,391 A | 5/2000 | Gardner |
| 6,061,662 A | 5/2000 | Makivic |
| 6,067,569 A | 5/2000 | Khaki et al. |
| 6,070,172 A | 5/2000 | Lowe |
| 6,073,160 A | 6/2000 | Grantham et al. |
| 6,105,067 A | 8/2000 | Batra |
| 6,134,551 A | 10/2000 | Aucsmith |
| 6,138,176 A | 10/2000 | McDonald et al. |
| RE36,946 E | 11/2000 | Diffie et al. |
| 6,147,976 A | 11/2000 | Shand et al. |
| 6,169,969 B1 | 1/2001 | Cohen |
| 6,173,270 B1 | 1/2001 | Cristofich et al. |
| 6,173,276 B1 | 1/2001 | Kant et al. |
| 6,175,874 B1 | 1/2001 | Imai et al. |
| 6,226,676 B1 | 5/2001 | Crump et al. |
| 6,236,980 B1 | 5/2001 | Reese |
| 6,263,321 B1 | 7/2001 | Daughtery, III |
| 6,279,113 B1 | 8/2001 | Vaidya |
| 6,304,858 B1 | 10/2001 | Mosler et al. |
| 6,317,728 B1 | 11/2001 | Kane |
| 6,317,795 B1 | 11/2001 | Malkin et al. |
| 6,336,150 B1 | 1/2002 | Ellis et al. |
| 6,339,819 B1 | 1/2002 | Huppenthal et al. |
| 6,370,645 B1 | 4/2002 | Lee |
| 6,377,942 B1 | 4/2002 | Hinsley et al. |
| 6,381,242 B1 | 4/2002 | Maher, III et al. |
| 6,389,532 B1 | 5/2002 | Gupta et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,415,269 B1 | 7/2002 | Dinwoodie |
| 6,418,419 B1 | 7/2002 | Nieboer et al. |
| 6,430,272 B1 | 8/2002 | Maruyama et al. |
| 6,456,632 B1 | 9/2002 | Baum et al. |
| 6,456,982 B1 | 9/2002 | Pilipovic |
| 6,463,474 B1 | 10/2002 | Fuh et al. |
| 6,499,107 B1 | 12/2002 | Gleichauf et al. |
| 6,546,375 B1 | 4/2003 | Pang et al. |
| 6,564,263 B1 | 5/2003 | Bergman et al. |
| 6,578,147 B1 | 6/2003 | Shanklin et al. |
| 6,594,643 B1 | 7/2003 | Freeny, Jr. |
| 6,704,816 B1 | 3/2004 | Burke |
| 6,711,558 B1 | 3/2004 | Indeck et al. |
| 6,765,918 B1 | 7/2004 | Dixon et al. |
| 6,766,304 B2 | 7/2004 | Kemp, II et al. |
| 6,772,132 B1 | 8/2004 | Kemp, II et al. |
| 6,772,136 B2 | 8/2004 | Kant et al. |
| 6,772,345 B1 | 8/2004 | Shetty |
| 6,778,968 B1 | 8/2004 | Gulati |
| 6,785,677 B1 | 8/2004 | Fritchman |
| 6,804,667 B1 | 10/2004 | Martin |
| 6,807,156 B1 | 10/2004 | Veres et al. |
| 6,839,686 B1 | 1/2005 | Galant |
| 6,850,906 B1 | 2/2005 | Chadha et al. |
| 6,870,837 B2 | 3/2005 | Ho et al. |
| 6,877,044 B2 | 4/2005 | Lo et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,944,168 B2 | 9/2005 | Paatela et al. |
| 6,978,223 B2 | 12/2005 | Milliken |
| 6,980,976 B2 | 12/2005 | Alpha et al. |
| 6,981,054 B1 | 12/2005 | Krishna |
| 7,024,384 B2 | 4/2006 | Daughtery, III |
| 7,046,848 B1 | 5/2006 | Olcott |
| 7,065,475 B1 | 6/2006 | Brundobler |
| 7,093,023 B2 | 8/2006 | Lockwood et al. |
| 7,099,838 B1 | 8/2006 | Gastineau et al. |
| 7,103,569 B1 | 9/2006 | Groveman et al. |

| | | | |
|---|---|---|---|
| 7,127,424 B2 | 10/2006 | Kemp, II et al. |
| 7,127,510 B2 | 10/2006 | Yoda et al. |
| 7,139,743 B2 | 11/2006 | Indeck et al. |
| 7,149,715 B2 | 12/2006 | Browne et al. |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,225,188 B1 | 5/2007 | Gai et al. |
| 7,228,289 B2 | 6/2007 | Brumfield et al. |
| 7,251,629 B1 | 7/2007 | Marynowski et al. |
| 7,286,564 B2 | 10/2007 | Roberts |
| 7,356,498 B2 | 4/2008 | Kaminsky et al. |
| 7,362,859 B1 | 4/2008 | Robertson et al. |
| 7,363,277 B1 | 4/2008 | Dutta et al. |
| 7,406,444 B2 | 7/2008 | Eng et al. |
| 7,565,525 B2 * | 7/2009 | Vorbach et al. ............ 713/100 |
| 7,840,482 B2 | 11/2010 | Singla et al. |
| 7,917,299 B2 | 3/2011 | Buhler et al. |
| 7,921,046 B2 | 4/2011 | Parsons et al. |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 2001/0013048 A1 | 8/2001 | Imbert de Tremiolles et al. |
| 2001/0014093 A1 | 8/2001 | Yoda et al. |
| 2001/0033656 A1 | 10/2001 | Gligor et al. |
| 2001/0052038 A1 | 12/2001 | Fallon et al. |
| 2001/0056547 A1 | 12/2001 | Dixon |
| 2002/0031125 A1 | 3/2002 | Sato |
| 2002/0069370 A1 | 6/2002 | Mack |
| 2002/0082967 A1 | 6/2002 | Kaminsky et al. |
| 2002/0095512 A1 | 7/2002 | Rana et al. |
| 2002/0105911 A1 | 8/2002 | Pruthi et al. |
| 2002/0129140 A1 | 9/2002 | Peled et al. |
| 2002/0138376 A1 | 9/2002 | Hinkle |
| 2002/0162025 A1 | 10/2002 | Sutton et al. |
| 2002/0166063 A1 | 11/2002 | Lachman et al. |
| 2002/0181709 A1 | 12/2002 | Sorimachi et al. |
| 2003/0009693 A1 | 1/2003 | Brock et al. |
| 2003/0014662 A1 | 1/2003 | Gupta et al. |
| 2003/0018630 A1 | 1/2003 | Indeck et al. |
| 2003/0023876 A1 | 1/2003 | Bardsley et al. |
| 2003/0033240 A1 | 2/2003 | Balson et al. |
| 2003/0037037 A1 | 2/2003 | Adams et al. |
| 2003/0039355 A1 | 2/2003 | McCanny et al. |
| 2003/0043805 A1 | 3/2003 | Graham et al. |
| 2003/0051043 A1 | 3/2003 | Wyschogrod et al. |
| 2003/0055658 A1 | 3/2003 | RuDusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0065607 A1 * | 4/2003 | Satchwell ............ 705/36 |
| 2003/0065943 A1 | 4/2003 | Geis et al. |
| 2003/0074582 A1 | 4/2003 | Patel et al. |
| 2003/0078865 A1 | 4/2003 | Lee |
| 2003/0093347 A1 | 5/2003 | Gray |
| 2003/0097481 A1 | 5/2003 | Richter |
| 2003/0099254 A1 | 5/2003 | Richter |
| 2003/0110229 A1 | 6/2003 | Kulig et al. |
| 2003/0126065 A1 | 7/2003 | Eng et al. |
| 2003/0163715 A1 | 8/2003 | Wong |
| 2003/0177253 A1 | 9/2003 | Schuehler et al. |
| 2003/0208430 A1 | 11/2003 | Gershon |
| 2003/0221013 A1 | 11/2003 | Lockwood et al. |
| 2004/0015633 A1 | 1/2004 | Smith |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0199448 A1 | 10/2004 | Chalermkraivuth et al. |
| 2004/0205149 A1 | 10/2004 | Dillon et al. |
| 2005/0033672 A1 | 2/2005 | Lasry et al. |
| 2005/0044344 A1 | 2/2005 | Stevens |
| 2005/0086520 A1 | 4/2005 | Dharmapurikar et al. |
| 2005/0091142 A1 | 4/2005 | Renton et al. |
| 2005/0097027 A1 | 5/2005 | Kavanaugh |
| 2005/0131790 A1 | 6/2005 | Benzschawel et al. |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0195832 A1 | 9/2005 | Dharmapurikar et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0267836 A1 | 12/2005 | Crosthwaite et al. |
| 2005/0283423 A1 | 12/2005 | Moser et al. |
| 2006/0020536 A1 | 1/2006 | Renton et al. |
| 2006/0031154 A1 | 2/2006 | Noviello et al. |
| 2006/0031156 A1 | 2/2006 | Noviello et al. |
| 2006/0053295 A1 | 3/2006 | Madhusudan et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0143099 A1 | 6/2006 | Partlow et al. |
| 2006/0259417 A1 | 11/2006 | Marynowski et al. |
| 2006/0294059 A1 | 12/2006 | Chamberlain et al. |
| 2007/0078837 A1 | 4/2007 | Indeck et al. |
| 2007/0118500 A1 | 5/2007 | Indeck et al. |
| 2007/0156574 A1 | 7/2007 | Marynowski et al. |
| 2007/0174841 A1 | 7/2007 | Chamberlain et al. |
| 2007/0277036 A1 | 11/2007 | Chamberlain et al. |
| 2007/0294157 A1 | 12/2007 | Singla et al. |
| 2008/0109413 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2009/0182683 A1 | 7/2009 | Taylor et al. |
| 2009/0287628 A1 | 11/2009 | Indeck et al. |
| 2011/0040701 A1 | 2/2011 | Singla et al. |

FOREIGN PATENT DOCUMENTS

| | | |
|---|---|---|
| EP | 0 880 088 | 11/1998 |
| EP | 0 887 723 | 12/1998 |
| EP | 0 911 738 A | 4/1999 |
| EP | 0573991 A1 | 1/2002 |
| JP | 02-136900 A | 5/1990 |
| JP | 03-014075 A | 1/1991 |
| JP | 09-145544 A | 6/1997 |
| JP | 9-269930 | 10/1997 |
| JP | 10-313341 | 11/1998 |
| JP | 11-306268 A | 11/1999 |
| JP | 11-316765 A | 11/1999 |
| JP | 2000357176 | 12/2000 |
| JP | 2001014239 | 1/2001 |
| JP | 2001217834 | 8/2001 |
| WO | WO9010910 | 9/1990 |
| WO | WO9737735 | 10/1997 |
| WO | 9905814 | 2/1999 |
| WO | 9955052 | 10/1999 |
| WO | 2000041136 A1 | 7/2000 |
| WO | WO 01/22425 A | 3/2001 |
| WO | 0139577 | 6/2001 |
| WO | 0161913 | 8/2001 |
| WO | 0180558 | 10/2001 |
| WO | WO 01/80082 A2 | 10/2001 |
| WO | 02061525 | 8/2002 |
| WO | 02082271 | 10/2002 |
| WO | 2003100650 | 4/2003 |
| WO | 2003036845 | 5/2003 |
| WO | 03100662 | 12/2003 |
| WO | 2004017604 | 2/2004 |
| WO | 2005017708 | 2/2005 |
| WO | WO 2005 017708 A2 | 2/2005 |
| WO | 2005026925 | 3/2005 |

| | | | |
|---|---|---|---|
| WO | 2005048134 A | 5/2005 | |
| WO | 2006023948 | 3/2006 | |
| WO | 2010077829 A1 | 7/2010 | |

OTHER PUBLICATIONS

Arnold et al., "The Splash 2 Processor and Applications", Proceedings 1993 IEEE International Conference on Computer Design: VLSI Iii Corrnputers and Processors (ICCD '93); Oct. 3, 1993; pp. 482-485; IEEE Computer Societr; Cambridge, MA USA.

Berk, "JLex: A lexical analyzer generator for JavaTM", downloaded from http://www.cs.princeton.edu/~appel/modernljava/Jlex/ in Jan. 2002.

Braun et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-98.

Choi et al., "Design of a Flexible Open Platform for High Performance Active Networks", Allerton Conference, Campaign, II, 1999.

Cloutier et al., "VIP: An FPGA—Based Processor for Image Processing and Neural Networks; Proceedings of Fifth International Conference on Microelectronics for Neural Networks", Feb. 12, 1996; pp. 330-336; Los Alamitos, California.

Compton et al., "Configurable Computing: A Survey of Systems and Software", Technical Report, Northwestern University, Dept. of BCE, 1999.

Ebeling et al., "RaPiD-Reconfigurable Pipelined Datapath", University of Washington, Dept. of Computer Science and Engineering, Sep. 23, 1996; Seattle, WA.

Franklin et al., "Assisting Network Intrusion Detection with Reconfigurable Hardware", Symposium on Field-Programmable Custom Computing Machines (FCCM 2002), Apr. 2002, Napa, California.

Gunther et al., "Assessing Document Relevance with Run-Time Reconfigurable Machines: FPGAs for custom computing machines", 1996; Proceedings, IEEE Symposium on Napa Valley, CA, Apr. 17, 1996.

Hauck et al., "Software Technologies for Reconfigurable Systems", Northwestern University, Dept. of BCE, Technical Report, 1996.

Hezel et al., "FPGA-based Template Matching using Distance Transforms", Proceedings of the 10th Annual IEEE Symposium on Field-Programmable Custom Computing Machines (FCCM '02); Apr. 22, 2002; pp. 89-97; IEEE Computer Society, USA.

Hollaar, Hardware Systems for Text information Retrieval; Proceedings of the Sixth Annual International ACM Sigir Conference on Research and Development in Information Retrieval; Jun. 6-8, 1983; pp. 3-9; Baltimore, Maryland, USA.

Keutzer et al., "A Survey of Programmable Platforms-Network Proc", University of California-Berkeley.

Kulig et al., "System and Method for Controlling Transmission of Data Packets Over an Information Network", pending U.S. Patent Application.

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., Field Programmable Port Extender (FPX) for Distributed Routing and Queuing, ACM International Symposium on Field Programmable Gate Arrays (FPGA '2000), Monterey, CA, Feb. 2000, pp. 137-144.

Lockwood et al., FPGrep and FPSed: Regular Expression Search and Substitution for Packet Streaming in Fleid Programmable Hardware, unpublished.

Lockwood et al., Hello, World: A Simple Application for the Field Programmable Port Extender (FPX), Washington University, Department of Computer Science, Technical Report WUCS-00-12, Jul. 11, 2000.

Lockwood et al., "Parallel FPGA Programming over Backplane Chassis", Washington University, Department of Computer Science, Technical Report WUCS-00-11, Jun. 12, 2000.

Lockwood et al., Reprogramable Network Packet Processing on the Field Programmable Port Extender (FPX), ACM International Symposium on Field Programmable Gal Arrays (FPGA '2001), Monterey, CA, Feb. 2001, pp. 87-93.

Lockwood, "An Open Platform for Development of Network Processing Modules in Reprogrammable Hardware", IEG DesignCon 2001, Santa Clara, CA, Jan. 2001, Paper WB-19.

Lockwood, "Building Networks with Reprogrammable Hardware", Field Programmable Port Extender: Jan. 2002 Gigabit Workshop Tutorial, Washington University, St. Louis, MO, Jan. 3-4, 2002.

Lockwood, "Evolvable Internet Hardware Platforms", NASA/DoD Workshop on Evolvable Hardware (EHW'0I), Long Beach, CA, Jul. 12-14, 2001, pp. 271-279.

Lockwood, "Hardware Laboratory Configuration", Field Programmable Port Extender: Jan. 2002 Gigabit Workshop Tutorial, Washington University, St. Louis, MO, Jan. 3-4, 2002.

Lockwood, "Introduction", Field Programmable Port Extender: Jan. 2002 Gigabit Workshop Tutorial, Washington, University, St. Louis, MO, Jan. 3-4, 2002.

Lockwood, "Platform and Methodology for Teaching Design of Hardware Modules in Internet Routers and Firewalls", IEEE Computer Society International Conference on Microelectronic Systems Education (MSE'2001), Las Vega, NV, Jun. 17-18, 2001, pp. 56-57.

Lockwood, "Protocol Processing on the FPX", Field Programmable Port Extender: Jan. 2002 Gigabit Workshop Tutorial, Washington University, St. Louis, MO, Jan. 3-4, 2002.

Lockwood, "Simulation and Synthesis", Field Programmable Port Extender: Jan. 2002 Gigabit Workshop Tutorial, Washington University, St. Louis, MO, Jan. 3-4, 2002.

Lockwood, "Simulation of the Hello World Application for the Field-Programmable Port Extender (FPX)", Washington University, Applied Research Lab, Spring 2001 Gigabits Kits Workshop.

"Lucent Technologies Delivers Payload Plus Network Processors for Programmable, Multi-Protocol, OC-48c Processing", Lucent Technologies Press Release, downloaded from http://www.lucent.comlpress/1000/0010320.meb.html on Mar. 21, 2002.

Mosanya et al., A FPGA-Based Hardware Implementation of Generalized Profile Search Using Online Arithmetic; ACM/Sigda International Symposium on Field Programmable Gate Arrays (FPGA'99); Feb. 21-23, 1999; pp. 101-111; Monterey, CA, USA.

Nunez et al., "The X-MatchLITE FPGA-Based Data Compressor", Buromicro Conference 1999, Proceedings, Italy, Sep. 8-10, 1999, Los Alamitos, CA.

"Overview, Field Programmable Port Extender", Jan. 2002 Gigabit Workshop Tutorial, Washington University, St. Louis, MO, Jan. 3-4 2002.

Partial International Search for PCT/US 03/15638; Feb. 3, 2004.

Patent Cooperation Treaty; International Search Report; May 6, 2004.

Patent Cooperation Treaty; International Search Report; Apr. 12, 2005.

Patent Cooperation Treaty; International Search Report; Jul. 10, 2003.

"Payload Plus Agere System Interface," Agere Systems Product Brief, Jun. 2001, downloaded from Internet, Jan. 2002.

Pramanik et al., "A Hardware Patteren Matching Algorithm on a Dataflow", Computer Journal; Jul. 1, 1985; pp. 264-269; vol. 28, No. 3; Oxford University Press, Surrey, Great Britain.

Pu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.

Ratha et al., "Convolution on Splash 2; Proceedings of IEEE Symposium on FPGAS for Custom Computing Machines", Apr. 19, 1995; pp. 204-213; Los Alamitos, California.

Schmit, "Incremental Reconfiguration for Pipelined Applications", Dept. of ECE, Carnegie Mellon University 1997, Pittsburgh, PA.

Shah, "Understanding Network Processors", Version 1.0, University of California-Berkeley, Sep. 4, 2001.

Shirazi et al.; Quantitative Analysis of FPGA-based Database Searching, Journal of VLSI Signal Processing Systems For Signal, Image, and Video Technology; May 2001; pp. 85-96; vol. 28, No. 1/2; Kluwer Academic Publishers; Dordrecht, NL.

Sidhu et al., "Fast Regular Expression Matching using FPGAs", IEEE Symposium on Field Programmable Custom Computing Machines (FCCM 2001), Apr. 2001.

Sidhu et al., "String Matching on Multicontext FPGAs using Self-Reconfiguration", FPGA '99: Proceedings of the 1999 ACM/SIGDA 7th International Symposium on Field Programmable Gate Arrays, Feb. 1999, pp. 217-226.

Taylor et al., "Generalized RAD Module Interface Specification of the Field Programmable Port Extender (FPX) Version 2", Washington University, Department of Computer Science, Technical Report, Jan. 8, 2000.

Taylor et al., "Modular Design Techniques for the FPX", Field Programmable Port Extender, Jan. 2002 Gigabit Workshop Tutorial, Washington University, St. Louis, MO, Jan. 3-4, 2002.

"The Field-Programmable Port Extender (FPX)", downloaded from http://www.arl.wustl.edu/arl/ in Mar. 2002.

Villasenor et al., Configurable Computer Solutions For Automatic Target Recognition; FPGAS for Custom Computing Machines, 1996,Proceedings, IEEE Symposium on Napa Valley, CA; Apr. 17-19, 1996; pp. 70-79; 1996 IEEE; Napa Valley, CA, Los Alamitos, CA, USA.

Yamaguchi et al., "High Speed Homology Search with FPGAs", Proceedings Pacific Symposium on Biocomputing; Jan. 3-7, 2002; pp. 271-282; vol. 7; Online; Lihue, Hawaii, USA.

Baer, "Computer Systems Architecture", 1990, pp. 262-265, Computer Science Press, Potomac, Maryland.

Baeza-Yates and Navarro, "New and Faster Filters for Multiple Approximate String Matching", Random Structures and Algorithms (RSA), vol. 20, No. 1, Jan. 2002, pp. 23-49.

Hayes, "Computer Architecture and Organization", Second Edition, 1988, pp. 448-459, McGraw-Hill, Inc.

Navarro, "A Guided Tour to Approximate String Matching", ACM Computing Surveys, vol. 33, No. 1, Mar. 2001, pp. 31-88.

Ramakrishna et al., "A Performance Study of Hashing Functions for Hardware Applications", Journal of Computing and Information, vol. 1, No. 1, May 1994, pp. 1621-1636.

Taylor and Turner, "Scalable Packet Classification using Distributed Crossproducting of Field Labels", Proceedings of IEEE Infocom, vol. 20, No. 1, Mar. 2005, pp. 1-12.

Taylor, "Models, Algorithms, and Architectures for Scalable Packet Classification", doctoral thesis, Department of Computer Science and Engineering, Washington University, St. Louis, MO, Aug. 2004.

"A Reconfigurable Computing Model for Biological Research Application of Smith-Waterman Analysis to Bacterial Genomes" A White Paper Prepared by Star Bridge Systems, Inc. [retrieved Dec. 12, 2006]. Retrieved from the Internet: <URL: http://www.starbridgesystems.com/resources/whitepapers/Smith%20 Waterman%20Whitepaper.pdf.

Altschul et al., "Basic Local Alignment Search Tool", J. Mol. Biol., Oct. 5, 1990, 215, pp. 403-410.

Cavnar et al., "N-Gram-Based Text Categorization", Proceedings of SDAIR-94, 3rd Annual Symposium on Document Analysis and Information Retrieval, Las Vegas, pp. 161-175, 1994.

Chodowiec et al., "Fast Implementations of Secret-Key Block Ciphers Using Mixed Inter- and Outer-Round Pipelining", Proceedings of International Symposium on FPGAs, pp. 94-102 (Feb. 2001).

Compton et al., "Reconfigurable Computing: A Survey of Systems and Software", Technical Report, Northwestern University, Dept. of ECE, 1999, presented by Yi-Gang Tai.

Crosman, "Who Will Cure Your Data Latency?", Storage & Servers, Jun. 20, 2007, URL: http://www.networkcomputing.com/article/printFullArticleSrc.jhtml?article ID=199905630.

Denoyer et al., "HMM-based Passage Models for Document Classification and Ranking", Proceedings of ECIR-01, 23rd European Colloquim Information Retrieval Research, Darmstatd, DE, pp. 126-135, 2001.

Edgar, "Muscle: Multiple Sequence Alignment with High Accuracy and High Throughput", Nucleic Acids Research, 2004, vol. 32, No. 5, pp. 1792-1797.

FIPS 197, "Advanced Encryption Standard", National Institute of Standards and Technology (2001).

FIPS Pub. 46-3. Data Encryption Standard (DES). Revised version of 46-2. Reaffirmed Oct. 25, 1999.

Forgy, "RETE: A fast algorithm for the many pattern/many object pattern matching problem", Artificial Intelligence, 19, pp. 17-37, 1982.

Harris, "Pete's Blog: Can FPGAs Overcome the FUD?", Low-Latency.com, May 14, 2007, URL: http://www.a-teamgroup.com/article/pete-blog-can-fpgas-overcome-the-fud/.

Hirsch, "Tech Predictions for 2008", Reconfigurable Computing, Jan. 16, 2008, URL: http://fpgacomputing.blogspot.com/2008_01_01_archive.html.

Hoinville, et al. "Spatial Noise Phenomena of Longitudinal Magnetic Recording Media", IEEE Transactions on Magnetics, vol. 28, No. 6, Nov. 1992.

Hutchings et al., "Assisting Network Intrusion Detection with Reconfigurable Hardware", FCCM 2002: 10th Annual IEEE Symposium on Field-Programmable Custom Computing Machines, 2002.

International Search Report for PCT/US2004/016021 dated Aug. 18, 2005.

International Search Report for PCT/US2007/060835 dated Jul. 9, 2007.

International Search Report for PCT/US2008/065955 dated Aug. 22, 2008.

International Search Report for PCT/US2008/066929 dated Aug. 29, 2008.

Invitation to Pay Additional Fees and Annex to Form PCT/ISA/206 Communication Relating to the Results of the Partial International Search for International Application No. PCT/US2003/015638 dated Feb. 3, 2004.

Jeanmougin et al., "Multiple Sequence Alignment with Clustal X", TIBS, 1998, vol. 23, pp. 403-405.

Jones et al., "A Probabilistic Model of Information Retrieval: Development and Status", Information Processing and Management, Aug. 1998, 76 pages.

Jung et al., "Efficient VLSI for Lempel-Ziv Compression in Wireless Data Communication Networks", IEEE Transactions on VLSI Systems, Sep. 1998, pp. 475-483, vol. 6, No. 3, Institute of Electrical and Electronics Engineers, Washington, DC, USA.

Pirsch et al., "VLSI Architectures for Video Compression—A Survey", Proceedings of the IEEE, Feb. 1995, pp. 220-243, vol. 83, No. 2, Institute of Electrical and Electronics Engineers, Washington, DC, USA.

Ramakrishna et al., "Efficient Hardware Hashing Functions for High Performance Computers", IEEE Transactions on Computers, Dec. 1997, vol. 46, No. 12.

Ranganathan et al., "High-Speed VLSI Designs for Lempe-Ziv Based Data Compression", IEEE Transactions on Circuits and Systems-II: Analog and Digital Signal Processing, Feb. 1993, pp. 96-106, vol. 40, No. 2, Institute of Electrical and Electronics Engineers, Washington, DC, USA.

Ratha et al., "FPGA-based coprocessor for text string extraction", IEEE, Sep. 11-13, 2000, pp. 217-221.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Roy, "A bounded search algorithm for segmented channel routing for FPGA's and associated channel architecture issues", IEEE, Nov. 11, 1993, pp. 1695-1705, vol. 12.

Schmerken, "With Hyperfeed Litigation Pending, Exegy Launches Low-Latency Ticker Plant", in Wall Street & Technology Blog, Mar. 20, 2007, pp. 1-2.

Steinbach et al., "A Comparison of Document Clustering Techniques", KDD Workshop on Text Mining, 2000.

Thompson et al., "The Clustal_X Windows Interface: Flexible Strategies for Multiple Sequence Alignment Aided by Quality Analysis Tools", Nucleic Acids Research, 1997, vol. 25, No. 24, pp. 4876-4882.

Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.

Ziv et al., "A Universal Algorithm for Sequential Data Compression", IEEE Trans. Inform. Theory, IT-23(3): 337-343 (1997).

Ziv et al., "Compression of Individual Sequence via Variable-Rate Coding", IEEE Transactions on Information Theory, Sep. 1978, pp.

530-536, vol. IT-24, No. 5, Institute of Electrical and Electronics Engineers, Washington, DC, USA.

Guerdoux-Jamet et al., Systolic Filter for Fast DNA Similarity Search, IEEE, 1995, pp. 145-156.

Barone-Asesi, G and Whaley, R., "Efficient Analytic Approximation of American Option Values" Journal of Finance, vol. 42, No. 2 (Jun. 1987), 301-320.

Web-Pop (Professional Options Package) (www.pmpublishing.com).

Jason Cong et al., An Optimal Technology Mapping Algorithm for Delay Optimization in Lookup-Table Based FPGA Designs, IEEE, 1992, 48-53.

D.M. Gavrila et al., Multi-feature hierarchical template matching using distance transforms, IEEE, Aug, 16-20, 1998, vol. 1, 439-444.

"RFC793: Transmission Control Protocol, Darpa Internet Program, Protocol Specification", Sep. 1981.

Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.

Artan et al., "Multi-packet Signature Detection using Prefix Bloom Filters", 2005, IEEE, pp. 1811-1816.

Baboescu et al., "Scalable Packet Classification".

Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.

Chaney et al., "Design of a Gigabit ATM Switch", Washington University, St. Louis.

Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.

Dharmapurikar et al., "Deep Packet Inspection Using Parallel Bloom Filters," Symposium on High Performance Interconnects (Hotl), Stanford, California, 2003, pp. 44-51.

Dharmapurikar et al., "Longest Prefix Matching Using Bloom Filters," SIGCOMM, 2003, pp. 201-212.

Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.

Feldmann, "BLT: Bi-Layer Tracing of HTTP and TCP/IP", AT&T Labs-Research, Florham Park, NJ, USA.

Gupta et al., "Packet Classification on Multiple Fields", Computer Systems Laboratory, Stanford University, Stanford, CA.

Gurtov, "Effect of Delays on TCP Performance", Cellular Systems Development, Sonera Corporation.

International Search Report for PCT/US2002/033286; Jan. 22, 2003.

International Search Report for PCT/US2005/030046; Sep. 25, 2006.

Jacobson et al., "RFC 1072: TCP Extensions for Long-Delay Paths", Oct. 1988.

Jacobson et al., "tcpdump—dump traffic on a network".

Johnson et al., "Pattern Matching in Reconfigurable Logic for Packet Classification", College of Computing, Georgia Institute of Technology, Atlanta, GA.

Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.

Madhusudan, "Design of a System for Real-Time Worm Detection", Master's Thesis, Washington Univ., Dept. of Computer Science and Engineering, St. Louis, MO, Aug. 2004.

Madhusudan, "Design of a System for Real-Time Worm Detection", Power Point Presentation in Support of Master's Thesis, Washington Univ., Dept. of Computer Science and Engineering, St. Louis, MO, Aug. 2004.

Mao et al., "Cluster-based Online Monitoring System of Web Traffic", Dept. of Computer Science and Technology, Tsinghua Univ., Bejing, 100084 P.R. China.

Moscola et al., "FPSed: A Streaming Content Search-And-Replace Module for an Internet Firewall", Proc. of Hot Interconnects, 11th Symposium on High Performance Interconnects, pp. 122-129, Aug. 20, 2003.

Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.

Necker et al., "TCP-Stream Reassembly and State Tracking in Hardware", School of Electrical and Computer Engineering, Georgia Institute of Technology, Atlanta, GA.

Prakash et al., "OC-3072 Packet Classification Using BDDs and Pipelined SRAMs", Department of Electrical and Computer Engineering, The University of Texas at Austin.

Roberts, "Internet Still Growing Dramatically Says Internet Founder", Press Release, Caspian Networks, Inc.—Virtual Pressroom.

Schuehler et al., "Architecture for a Hardware Based, TCP/IP Content Scanning System", IEEE Micro, 24(1):62-69, Jan.-Feb. 2004, USA.

Schuehler et al., "TCP-Splitter: A TCP/IP Flow Monitor in Reconfigurable Hardware", Hot Interconnects 10 (Hotl-10), Stanford, CA, Aug. 21-23, 2002, pp. 127-131.

Shalunov et al., "Bulk TCP Use and Performance on Internet 2".

Singh et al., "The EarlyBird System for Real-Time Detection on Unknown Worms", Technical report CS2003-0761, Aug. 2003.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Waldvogel et al., "Scalable High-Speed Prefix Matching".

Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.

Wooster et al., "HTTPDUMP Network HTTP Packet Snooper", Apr. 25, 1996.

Yan et al., "Enhancing Collaborative Spam Detection with Bloom Filters", 2006, IEEE, pp. 414-425.

Braun et al., "Protocol Wrappers for Layered Network Packet Processing in Reconfigurable Hardware", IEEE Micro, Jan.-Feb. 2002, pp. 66-74.

Summons to Attend Oral Proceedings for European Patent Application No. 03729000.4 dated Mar. 17, 2010.

Fernandez, "Template Matching of Binary Targets in Grey-Scale Images: A Nonparametric Approach", Pattern Recognition, 1997, pp. 1175-1182, vol. 30, No. 7.

International Preliminary Report on Patentability (Chapter I) for PCT/US2008/066929 dated Jan. 7, 2010.

Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.

English Translation of Office Action for JP Application 2004-508044 dated Feb. 9, 2010.

Office Action for U.S. Appl. No. 11/765,306 dated Mar. 29, 2010.

Written Submissions to EPO dated May 10, 2010 for European Patent Application No. 03729000.4.

Amanuma et al., "FPGA Architecture for High Speed Computation", Proceedings of 60th Convention Architecture, Software Science, Engineering, Mar. 14, 2000, pp. 1-163-1-164, Information Processing Society, Japan.

Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.

Google Search Results Page for "field programmable gate array financial calculation stock market" over dates of Jan. 1, 1990-May 21, 2002, 1 page.

Gupta et al., "High-Speed Implementations of Rule-Based Systems," ACM Transactions on Computer Systems, May 1989, pp. 119-146, vol. 7, Issue 2.

Gupta et al., "PMM: A Parallel Architecture for Production Systems," Proceedings of the IEEE, Apr. 1992, pp. 693-696, vol. 2.

Office Action for AU Application 2009200148 dated Nov. 9, 2010.

Patterson, "High Performance DES Enctyption in Virtex(T™) FPGAs using JBits(™)", IEEE Symposium on Field-Programmable Custom Computing Machines, 2000, pp. 113-121.

Sachin Tandon, "A Programmable Architecture for Real-Time Derivative Trading", Master's Thesis, University of Edinburgh, 2003.

Seki et al., "High Speed Computation of Shogi With FPGA", Proceedings of 58th Convention Architecture, Software Science, Engineering, Mar. 9, 1999, pp. 1-133-1-134.

Tau et al., "Transit Note #114: A First Generation DPGA Implementation", Jan. 1995, 9 pages.

Yamaguchi et al., "An Approach for Homology Search with Reconfigurable Hardware", Google, 2001, pp. 374-375.

Yoshitani et al., "Performance Evaluation of Parallel Volume Rendering Machine ReVolver/C40", Study Report of Information Processing Society, Mar. 5, 1999, pp. 79-84, vol. 99, No. 21.

U.S. Appl. No. 61/421,545, filed Dec. 9, 2010 (Taylor et al.).

U.S. Appl. No. 13/076,906, filed Mar. 31, 2011 (Parsons et al.).

U.S. Appl. No. 13/076,929, filed Mar. 31, 2011 (Parsons et al.).

U.S. Appl. No. 13/076,951, filed Mar. 31, 2011 (Parsons et al.).

U.S. Appl. No. 13/076,968, filed Mar. 31, 2011 (Parsons et al.).

U.S. Appl. No. 13/076,982, filed Mar. 31, 2011 (Parsons et al.).

U.S. Appl. No. 13/077,036, filed Mar. 31, 2011 (Parsons et al.).

U.S. Appl. No. 13/077,224 filed Mar. 31, 2011 (Parsons et al.).

U.S. Appl. No. 13/077,294, filed Mar. 31, 2011 (Parsons et al.).

U.S. Appl. No. 13/132,408, filed Jun. 2, 2011 (Taylor et al.).

U.S. Appl. No. 13/154,804, filed Jun. 7, 2011 (Taylor et al.).

U.S. Appl. No. 13/154,824, filed Jun. 7, 2011 (Taylor et al.).

Provisional Opinion of Examining Division for EP Patent Application No. 03729000.4 dated Jun. 2, 2010.

Decision of the Examining Division for EP Patent Application No. 03729000.4 dated Jul. 12, 2010.

Statement of Grounds of Appeal for EP Patent Application No. 03729000.4 dated Nov. 22, 2010.

Minutes of the Oral Proceedings for EP Patent Application No. 03729000.4 dated Jul. 12, 2010.

Notice of Allowance for U.S. Appl. No. 10/550,323 dated Aug. 5, 2011.

* cited by examiner

|   | p | q | r | a | x | a | b | c | s | t | v | q | ... |
|---|---|---|---|---|---|---|---|---|---|---|---|---|---|
| a | -1 | -1 | -1 | 2 | 1 | 2 | 1 | 0 | -1 | -1 | -1 | -1 | |
| x | -1 | -2 | -2 | 1 | 4 | 3 | 2 | 1 | 0 | -1 | -2 | -2 | |
| b | -1 | -2 | -3 | 0 | 3 | 2 | 5 | 4 | 3 | 2 | 1 | 0 | |
| a | -1 | -2 | -3 | -1 | 2 | 1 | 4 | 3 | 2 | 1 | 0 | -1 | |
| c | -1 | -2 | -3 | -2 | 1 | 0 | 3 | 6 | 5 | 4 | 3 | 2 | |
| s | -1 | -2 | -3 | -3 | 0 | -1 | 2 | 5 | <u>8</u> | 7 | 6 | 5 | |

Figure 19

METHOD AND APPARATUS FOR PROCESSING FINANCIAL INFORMATION AT HARDWARE SPEEDS USING FPGA DEVICES

CROSS REFERENCE TO RELATED APPLICATION

This application is a continuation of Ser. No. 10/153,151 filed May 21, 2002, now U.S. Pat. No. 7,139,743, the disclosure of which is incorporated herein by reference.

BACKGROUND OF THE INVENTION

Indications are that the average database size and associated software support systems are growing at rates that are greater than the increase in processor performance (i.e., more than doubling roughly every 18 months). This is due to a number of factors including without limitation the desire to store more detailed information, to store information over longer periods of time, to merge databases from disparate organizations, and to deal with the large new databases which have arisen from emerging and important applications. For example, two emerging applications having large and rapidly growing databases are those connected with the genetics revolution and those associated with cataloging and accessing information on the Internet. In the case of the Internet, current industry estimates are that in excess of 1.5 million pages are added to the Internet each day. At the physical level this has been made possible by the remarkable growth in disk storage performance where magnetic storage density has been doubling every year or so for the past five years.

Search and retrieval functions are more easily performed on information when it is indexed. For example, with respect to financial information, it can be indexed by company name, stock symbol and price. Oftentimes, however, the information being searched is of a type that is either hard to categorize or index or which falls into multiple categories. As a result, the accuracy of a search for information is only as good as the accuracy and comprehensiveness of the index created therefor. In the case of the Internet, however, the information is not indexed. The bottleneck for indexing is the time taken to develop the reverse index needed to access web pages in reasonable time. For example, while there are search engines available, designing a search which will yield a manageable result is becoming increasingly difficult due to the large number of "hits" generated by less than a very detailed set of search instructions. For this reason, several "intelligent" search engines have been offered on the web, such as Google, which are intended to whittle down the search result using logic to eliminate presumed undesired "hits".

With the next-generation Internet, ever-faster networks, and expansion of the Internet content, this bottleneck is becoming a critical concern. Further, it is becomingly exceedingly difficult to index information on a timely basis. In the case of the Internet, current industry estimates are that in excess of 1.5 million pages are added to the Internet each day. As a result, maintaining and updating a reverse index has become an enormous and continuous task and the bottleneck it causes is becoming a major impediment to the speed and accuracy of existing search and retrieval systems. Given the ever increasing amounts of information available, however, the ability to accurately and quickly search and retrieve desired information has become critical.

DESCRIPTION OF ART

Associative memory devices for dealing with large databases are known in the prior art. Generally, these associative memory devices comprise peripheral memories for computers, computer networks, and the like, which operate asynchronously to the computer, network, etc. and provide increased efficiency for specialized searches. Additionally, it is also known in the prior art that these memory devices can include certain limited decision-making logic as an aid to a main CPU in accessing the peripheral memory. An example of such an associative memory device particularly adapted for use with a rotating memory such as a high speed disk or drum can be found in U.S. Pat. No. 3,906,455, the disclosure of which is incorporated herein by reference. This particular device provides a scheme for use with a rotating memory and teaches that two passes over a memory sector is necessary to presort and then sort the memory prior to performing any logical operations thereon. Thus, this device is taught as not being suitable for use with any linear or serial memory such as magnetic tape or the like.

Other examples of prior art devices may also be found in U.S. Pat. Nos. 3,729,712; 4,464,718; 5,050,075; 5,140,692; and 5,721,898; the disclosures of which are incorporated herein by reference.

As an example, in U.S. Pat. No. 4,464,718, Dixon performs fixed comparisons on a fixed number of bytes. They don't have the ability to scan and correlate arbitrarily over the data. They search serially along the tracks in a given disk cylinder but there is no provision for parallel searching across disks. Dixon's comparisons are limited by a fixed rigid number of standard logical operation types. Additionally, the circuitry presented supports only these single logical operations. There is no support for approximate or fuzzy matching.

While these prior art associative memory devices represent an attempt to speed the input and output of information to and from a peripheral memory, which in many cases is a mass storage memory device, all rely on the classic accessing of data stored in digital form by reading and interpreting the digital either address or content of the memory location. In other words, most such devices access data by its address but there are some devices that take advantage of the power of content addressing as is well known in the art. Nevertheless, in all of the prior art known to the inventors, the digital value of the address or data contained in the addressed location must be read and interpreted in its digital form in order to identify the data and then select it for processing. Not only does it take processing time to read and interpret the digital data represented by the address or content, this necessarily requires that the accessing circuit process the memory according to the structure of the data stored. In other words, if the data is stored in octets, then the accessing circuitry must access the data in octets and process it in an incremental manner. This "start and stop" processing serves to increase the input/output time required to access data. As is also well known in the art, this input/output time typically represents the bottleneck and effective limitation of processing power in any computer or computer network.

Furthermore, given the vast amount of information available to be searched, data reduction operations (i.e., the ability to summarize data in some aggregate form) has become critical. Oftentimes, the ability to quickly perform data reduction functions can provide a company with a significant competitive advantage.

Likewise, with the improvements in digital imaging technology, the ability to perform two dimensional matching such as on images has become necessary. For example, the ability to conduct matches on a particular image of an individual, such as his or her face or retina, or on a fingerprint, is becoming critical to law enforcement as it steps up its efforts on security in light of the Sep. 11, 2001 terrorist attacks. Image matching is also of importance to the military in the area of automatic target recognition.

Finally, existing searching devices cannot currently be quickly and easily reconfigured in response to changing application demands.

Accordingly, there is a need for an improved information search and retrieval system and method which overcomes these and other problems in the prior art.

In order to solve these and other problems in the prior art, the inventors herein have succeeded in designing and developing a method and apparatus for an associative memory using Field Programmable Gate Arrays (FPGA) in several embodiments described in the parent U.S. Pat. No. 7,139,743, which provide an elegantly simple solution to these prior art limitations as well as dramatically decreased access times for data stored in mass storage memories. As described below, the invention has several embodiments each of which has its own advantages.

U.S. Pat. No. 6,711,558, which is the parent of the '743 patent referenced above, discloses and claims the use of programmable logic and circuitry generally without being specific as to any choice between the various kinds of devices available for this part of the invention. In the '743 patent, the inventors disclose more specifically the use of FPGA's as part of the circuitry for various reasons as their best mode. There are several reasons for that. The first of these is speed. And, there are two different aspects of operation in which speed plays a part. The first of these is the speed of reconfiguration. It is known in the art that FPGA's may be quickly programmed in the field to optimize the search methodology using a template, the template having been prepared in advance and merely communicated to the FPGA's over a connecting bus. Should it then be desired to search using a different methodology, the FPGA's may then be quickly and conveniently re-programmed with another prepared template in a minimal number of clock cycles and the second search started immediately. Thus, with FPGA's as the re-configurable logic, shifting from one search to another is quite easy and quick, relative to other types of re-programmable logic devices.

A second aspect of speed is the amount of time required, once programmed, a search requires. As FPGA's are hardware devices, searching is done at hardware processing speeds which is orders of magnitude faster than at software processing speeds as would be experienced with a microprocessor, for example. Thus, FPGA's are desirable over other software implementations where speed is a consideration as it most often is.

In considering the use of templates, it is contemplated that at least several "generic" templates would be prepared in advance and would be available for use in performing text searching in either an absolute search, an approximate search, or a higher or advanced search mode incorporating a Boolean algebra logic capability, or a graphics search mode. These could then be stored in a CPU memory and be available either on command or loaded in automatically in response to a software queue indicating one of these searches.

Still another factor to consider is cost, and the recent price reductions in FPGA's have made them more feasible for implementation as a preferred embodiment for this application, especially as part of a hard disk drive accelerator as would be targeted for a pc market. It is fully expected that further cost reductions will add to the desirability of these for this implementation, as well as others as discussed in greater detail below.

Generally, various embodiments of the '743 patent describe a technique for data retrieval through approximate matching of a data key with a continuous reading of data as stored on a mass storage medium, using FPGA's to contain the template for the search and do the comparison, all in hardware and at essentially line speed. By utilizing FPGA's, the many advantages and features commonly known are made available. These include the ability to arrange the FPGA's in a "pipeline" orientation, in a "parallel" orientation, or even in an array incorporating a complex web overlay of interconnecting data paths allowing for complex searching algorithms. In its broadest, and perhaps most powerful, embodiment, the data key may be an analog signal and it is matched with an analog signal generated by a typical read/write device as it slews across the mass storage medium. In other words, the steps taught to be required in the prior art of not only reading the analog representation of digital data stored on the mass storage medium but also the conversion of that signal to its digital format prior to being compared are eliminated. Furthermore, there is no requirement that the data be "framed" or compared utilizing the structure or format in which the data has been organized and stored. For an analog signal, all that need be specified is the elapsed time of that signal which is used for comparison with a corresponding analog continuously changing selected time portion of the "read" signal. Using any one of many standard correlation techniques as known in the prior art, the data "key" may then be approximately matched to the sliding "window" of data signal to determine a match. Significantly, the same amount of data may be scanned much more quickly and data matching the search request may be determined much more quickly as well. For example, the inventors have found that CPU based approximate searches of 200 megabytes of DNA sequences can take up to 10 seconds on a typical present day "high end" system, assuming the offline processing to index the database has already been completed. In that same 10 seconds, the inventors have found that a 10-gigabyte disk could be magnetically searched for approximate matches using the present invention. This represents a 50:1 improvement in performance. Furthermore, in a typical hard disk drive there are four surfaces and corresponding read/write heads, which may be all searched in parallel should each head be equipped with the present invention. As these searches can proceed in parallel, the total increase in speed or improvement represents a 200:1 advantage. Furthermore, additional hard disk drives may be accessed in parallel and scaled to further increase the advantage provided by the present invention.

By choosing an appropriate correlation or matching technique, and by setting an appropriate threshold, the search may be conducted to exactly match the desired signal, or more importantly and perhaps more powerfully, the threshold may be lowered to provide for approximate matching searches. This is generally considered a more powerful search mode in that databases may be scanned to find "hits" which may be valid even though the data may be only approximately that which is being sought. This allows searching to find data that has been corrupted, incorrectly entered data, data which only generally corresponds to a category, as well as other kinds of data searches that are highly desired in many applications. For example, a library of DNA sequences may be desired to be searched and hits found which represent an approximate match to a desired sequence of residues. This ensures that sequences which are close to the desired sequence are found and not discarded but for the difference in a forgivable number of residue mismatches. Given the ever-increasing volume and type of information desired to be searched, more complex searching techniques are needed. This is especially true in the area of molecular biology, "[O]ne of the most powerful methods for inferring the biological function of a gene (or the protein that it encodes) is by sequence similarity searching on protein and DNA sequence databases." Garfield, "*The Importance of (Sub)sequence Comparison in Molecular Biology*," pgs. 212-217, the disclosure of which is incorporated herein by reference. Current solutions for sequence matching are only available in software or non-reconfigurable hardware.

Still another application involves Internet searches provided by Internet search engines. In such a search, approximate matching allows for misspelled words, differently spelled words, and other variations to be accommodated without defeating a search or requiring a combinatorial number of specialized searches. This technique permits a search engine to provide a greater number of hits for any given search and ensure that a greater number of relevant web pages are found and cataloged in the search. Although, as mentioned above, this approximate matching casts a wider net which produces a greater number of "hits" which itself creates its own problems.

Still another possible application for the technology described in the '743 patent is for accessing databases which may be enormous in size or which may be stored as analog representations. For example, our society has seen the implementation of sound recording devices and their use in many forums including judicial proceedings. In recent history, tape recordings made in the President's oval office have risen in importance with respect to impeachment hearings. As can be appreciated, tape recordings made over the years of a presidency can accumulate into a huge database which might require a number of persons to actually listen to them in order to find instances where particular words are spoken that might be of interest. Utilizing the technology described in the '743 patent, an analog representation of that spoken word can be used as a key and sought to be matched while the database is scanned in a continuous manner and at rapid speed. Thus, the technology described in the '743 patent provides a powerful search tool for massive analog databases as well as massive digital databases.

While text-based searches are accommodated by the '743 patent as described above, storage media containing images, sound, and other representations have traditionally been more difficult to search than text. The '743 patent further describes embodiments that allow searching a large data base for the presence of such content or fragments thereof. For example, the key in this case could be a row or quadrant of pixels that represent the image being sought. Approximate matching of the key's signal can then allow identification of matches or near matches to the key. In still another image application, differences in pixels or groups of pixels can be searched and noted as results which can be important for satellite imaging where comparisons between images of the same geographic location are of interest as indicative of movement of equipment or troops.

The technology described in the '743 patent may be embodied in any of several configurations, as is noted more particularly below. However, one important embodiment is perhaps in the form of a disk drive accelerator which would be readily installed in any PC as an interface between the hard disk drive and the system bus. This disk drive accelerator could be provided with a set of standardized templates and would provide a "plug and play" solution for dramatically increasing the speed at which data could be accessed from the drive by the CPU. This would be an after market or retrofit device to be sold to the large installed base of PC's. It could also be provided as part of a new disk drive, packaged within the envelope of the drive case or enclosure for an external drive or provided as an additional plug in pc card as an adapter for an internal drive. Additional templates for various kinds of searches on various kinds of databases could be made available either with the purchase of the accelerator, such as by being encoded on a CD, or even over the Internet for download, as desired.

BRIEF SUMMARY OF THE INVENTION

The present invention leverages the hardware acceleration and flexibility provided by reconfigurable logic devices to perform various operations on streaming data, particularly operations on streaming financial information such as data reduction operations (e.g., aggregate summarization operations). For example, in the financial industry, one might want to search financial information to identify a minimum, maximum, and latest price of a stock. The ability to perform data reduction searching such as this at high speeds cannot be under-estimated. One of the most valuable aspects of information is its timeliness. Companies that can quickly compute aggregate data reductions will clearly have a competitive advantage over those that cannot compute such aggregate data reductions as quickly.

Thus, in accordance with an exemplary aspect of the invention, the inventors disclose a method for processing financial information, the method comprising: (1) streaming financial information through a reconfigurable logic device, and (2) performing a data processing operation on the financial information with the reconfigurable logic device on a streaming basis as the financial information streams through the reconfigurable logic device.

In accordance with another exemplary aspect of the invention, the inventors disclose an apparatus for processing financial information, the apparatus comprising a reconfigurable logic device, wherein the reconfigurable logic device is configured to receive a stream of financial information and perform a data processing operation on the financial information on a streaming basis as the financial information streams through.

Moreover, in accordance with another exemplary aspect of the invention, the inventors disclose a method for processing financial information, the method comprising: (1) receiving a stream of financial information within a reconfigurable logic device, and (2) summarizing the received financial information in an aggregate form on a streaming basis using logic deployed on the reconfigurable logic device as the financial information streams through the reconfigurable logic device.

Furthermore, in accordance with another exemplary aspect of the invention, the inventors disclose a system comprising at least one reconfigurable logic device that is configured to (i) store a data key, (ii) receive a stream of target data, (iii) continuously match the target data against the data key to find matched data within target data, and (iv) summarize the matched data in an aggregate form, wherein the reconfigurable logic device is further configured to perform the continuous match operation and the summarization operation on a streaming basis as the target data streams through the reconfigurable logic device.

Further still, in accordance with yet another exemplary aspect of the invention, the inventors disclose a method comprising: (1) streaming target data into a reconfigurable logic device that has been loaded with a data key, (2) continuously matching the streaming target data against the data key to find matched data within the streaming target data, and (3) summarizing the matched data in an aggregate form, and wherein the matching step and the summarizing step are performed by the reconfigurable logic device on a streaming basis as the target data streams through the reconfigurable logic device.

While the principal advantages and features of the present invention have been briefly explained above, a more thorough understanding of the invention may be attained by referring to the drawings and description of the preferred embodiment which follow.

BRIEF DESCRIPTION OF THE DRAWINGS

FIG. 19 is the table of FIG. 15 representing a particular sequence matching example;

FIGS. 20, 21 and 22 are block diagrams of the systolic array architecture of FIG. 20 in operation during the combinational and latch part of the clock cycle, respectively, of the system of FIG. 1;

DETAILED DESCRIPTION OF THE PREFERRED EMBODIMENT

Figure 1:
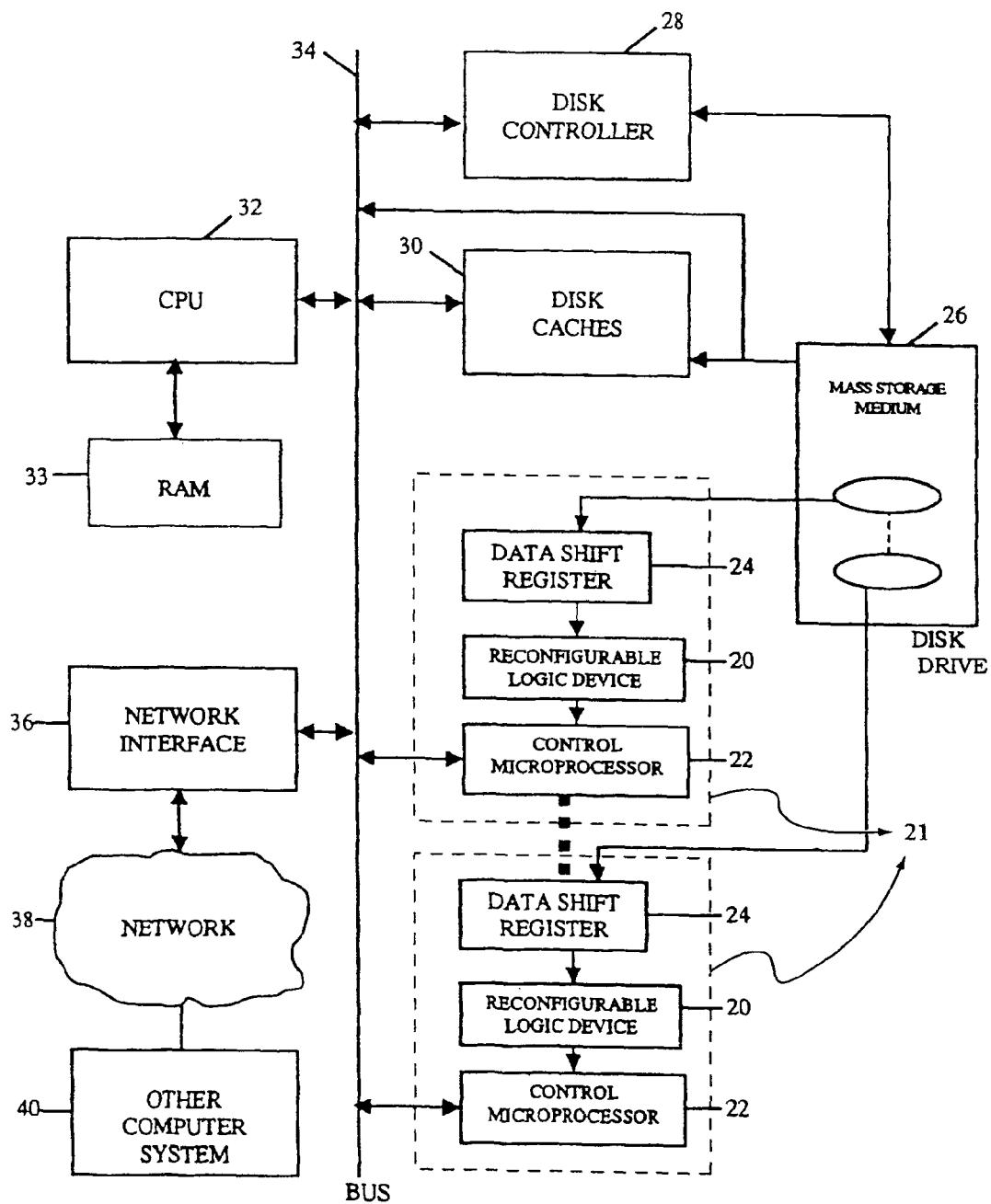
FIG. 1 is a block diagram illustrating an information search and retrieval system in accordance with one embodiment of the present invention.

As shown in FIG. 1, the present invention is readily implemented in a stand-alone computer or computer system. In broad terms, the present invention is comprised of at least one re-configurable logic device 21 coupled to at least one magnetic mass storage medium 26, with that re-configurable logic device being an FPGA. As depicted in FIG. 1, the re-configurable logic device 21 may itself include a plurality of functional logic elements including a data shift register and possibly a microprocessor, or they could be on separate chips, or the individual logic elements could be configured in a pipeline or parallel orientation as shown in some of the other figures herein. In any event, re-configurable logic refers to any logic technology whose form and function can be significantly altered (i.e., reconfigured) in the field post-manufacture. Examples of re-configurable logic devices include without limitation programmable logic devices (PLDs). A PLD is an umbrella term for a variety of chips that are programmable. There are generally three physical structures for a PLD. The first is the permanent fuse type which blows apart lines or fuses them together by electrically melting an aluminum trace or insulator. This was the first type of PLD, known as a "programmable array logic" or PAL. The second type of PLD uses EEPROM or flash memory, and causes a transistor to open or close depending on the contents of its associated memory cell. The third type of PLD is RAM-based (which makes it dynamic and volatile), and its contents are loaded each time it starts up. An FPGA is an integrated circuit (IC) that contains an array of logic units that can be interconnected in an arbitrary manner. These logic units are referred to as CFB's or configurable logic blocks by one vendor (Xilinx). Both the specific function of each logic unit and the interconnections between logic units can be programmed in the field after manufacture of the IC. FPGAs are one of the most common PLD chips. FPGAs are available in all three structures. In the preferred embodiment of the present invention, re-configurable logic device 21 is constructed using Xilinx FPGA technology, and its configuration is developed using the Mentor synthesis tools and the Xilinx place-and-route tools, all of which are presently commercially available as known to those of skill in the art.

The re-configurable logic device 21 interfaces with the system or input/output bus 34 and, in one configuration, also interfaces with any disk caches 30 which may be present. It receives and processes search requests or inquires from the CPU 32 or network interface 36. Additionally, the device may aid in passing the results of the inquiries to either or both the disk cache 30 and/or the CPU 32 (by way of the bus 34).

The mass storage medium 26 provides the medium for storing large amounts of information which will hereafter be referred to as target data. The term "mass storage medium" should be understood as meaning any magnetic device used to store large amounts of data, and which is typically designated for use in a computer or computer network. Examples include without limitation hard disk drives or sub-units such as a single disk surface, and these systems may be rotating, linear, serial, parallel, or various combinations of each. For example, a rack of hard disk drive units could be connected in parallel and their parallel output provided at the transducer level to one or more re-configurable logic devices 21. Similarly, a bank of magnetic tape drives could be used, and their serial outputs each provided in parallel to one or more re-configurable logic devices 21. The data stored on the medium may be in analog or in digital form. For example, the data could be voice recordings. The present invention is thus scalable, permitting an increase in the amount of data stored by increasing the number of parallel mass storage media, while preserving the performance by increasing the number of parallel re-configurable logic devices or replicating the re-configurable logic device.

In the prior art as shown in the upper portion of FIG. 1, typically a disk controller 28 and/or a disk cache 30 may be used in the traditional sense for access by a CPU 32 over its system or input/output bus 34. The re-configurable logic device 21 accesses target data in the mass storage medium 26 via one or more data shift registers 24 and presents it for use at the system bus 34 without moving large blocks of memory from the mass storage medium 26 over the system bus 34 and into the working memory 33 of CPU 32 for sorting and accessing. In other words, as is explained in greater detail below, the CPU 32 may send a search request or inquiry to the re-configurable logic device 21 which then asynchronously accesses and sorts target data in the mass storage medium 26 and presents it for use either in a disk cache 30 as is known in the prior art or directly onto the system bus 34 without further processing being required by CPU 32 or use of its working memory 33. The CPU 32 is thus free to perform other tasks while the searching and matching activity is being performed by the present invention. Alternately, the control microprocessor may provide the search inquiry and template or programming instructions for the FPGA 21, and then perform the search and present the data on system bus 34 for access and use by CPU 32.

Figure 2:
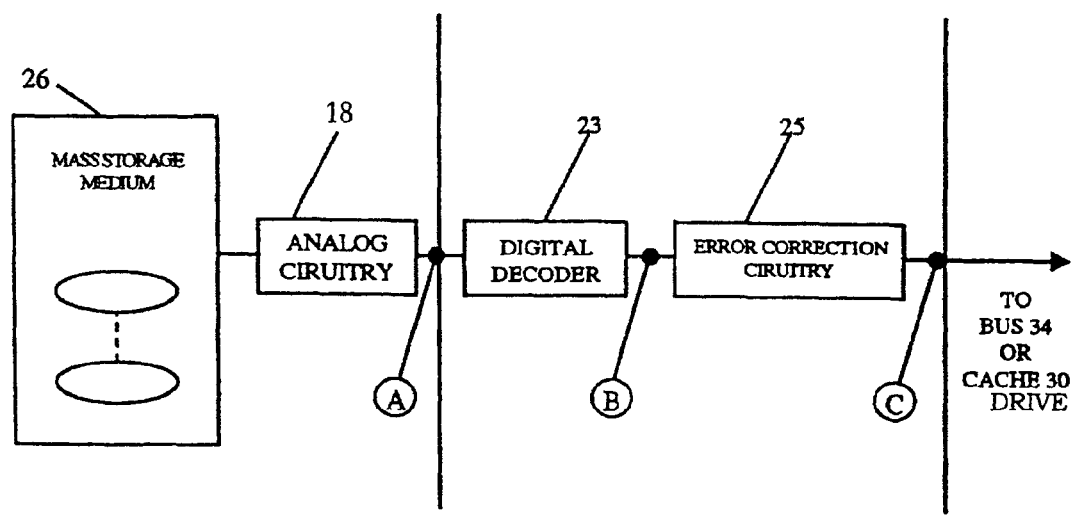
FIG. 2 is a schematic of a conventional rigid disk drive system illustrating different insertion points for connection of the present invention.

As has been explained above, the present invention may be used to perform a variety of different types of matching or data reduction operations on the target data. Each one of these operations will now be discussed in detail below. For all operations, however, it will be assumed that the target data is written onto the magnetic mass storage medium 26 with sufficient formatting information attached so that the logical structure of the target data can be extracted. Exact and approximate string matching will be described with reference to FIGS. 2-5. It can be appreciated, however, that the present invention is not limited to single string matches and is equally suitable for compound query matching (i.e., queries involving a plurality of text strings having a certain logical relationship therebetween or which use Boolean algebra logic). When performing an exact match with the re-configurable logic device 21 in the analog domain, shown as Point A in FIG. 2, where matching is done using analog comparators and correlation techniques, an exact match corresponds to setting a sufficiently high threshold value for matching the data key with analog target data on the mass storage medium 26. Approximate matching in the analog domain corresponds to setting appropriate (lesser) threshold values. The success of an approximate match may be determined by the correlation value set in the re-configurable logic device 21 or by using one of a number of matching-performance metrics stored therein such as the number of bits within a data key that are equal to the corresponding bits in the scanned target data.

More particularly, a conventional rigid disk drive may have a plurality of rotating disks with multiple transducers accessing each disk. Each of these transducers typically has its output feeding analog signal circuitry 18, such as amplifiers. This is represented at point A. As further shown in FIG. 2, typically the outputs of the analog circuitry are selectively provided to a single digital decoder 23 which then processes one such output. This is represented at point B. This digital output is typically then sent through error correction circuitry (ECC) 25 and at its output C is then passed on to the bus 34 or disk cache 30. For purposes of the present invention, it may be desirable to provide multiple parallel paths for target data by providing multiple digital decoders and ECC's. Exact matching in the digital domain could be performed at Point B or Point C, which corresponds to the pre- and post-error-corrected digital signal, respectively.

The results may be sent to a control microprocessor 22, which may or may not be configured as part of an FPGA, to execute logic associated with a compound or complex search inquiry. In the most general case, a compound search inquiry 40 will go through the transformation process illustrated in FIG. 3. In particular, the software system (not shown) that resides on the CPU 32 generates the search inquiry 40. This inquiry proceeds through a compiler 42, also located on the CPU 32, that is responsible for analyzing the search inquiry. There are three main results from this analysis: (1) determining the data key that will reside in the compare registers within the re-configurable logic device 21; (2) determining the combining logic that must be implemented in the control microprocessor 22; and (3) producing hardware description 44 in a standard hardware description language (HDL) format (or if possible retrieving one from a library) that will be used to generate synthesis commands 46 to the re-configurable logic device 21. Any commercially available HDL and associated compiler and synthesis tools may be used. The resulting logic functions may correspond to exact or inexact matches or wildcard operations and simple word level logic operations such as "and" and "or." This synthesis information is sent to the control microprocessor 22 which acts to set up the re-configurable logic device 21, or FPGA. In the case of complex logic operations, a high-level language 48 such as C or C+ is used in conjunction with a compiler 50 to generate the appropriate synthesis commands to the microprocessor 22.

Figure 3:
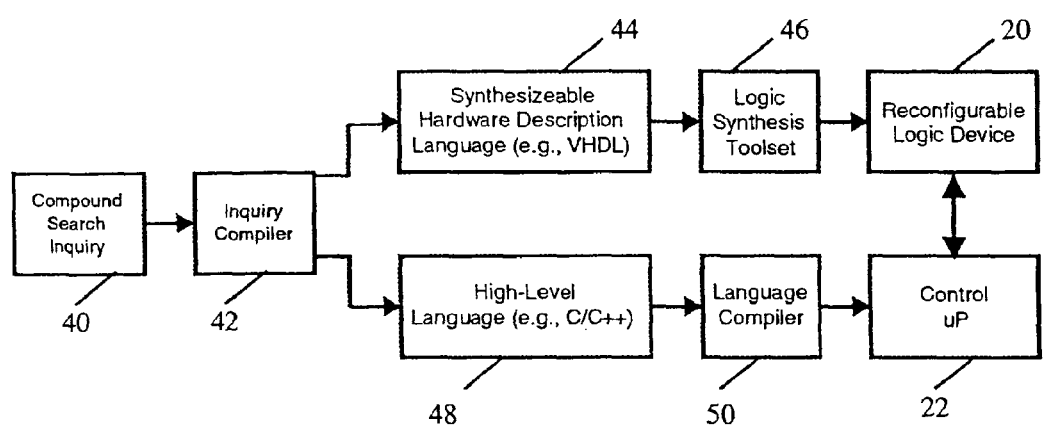
FIG. 3 is a block diagram of one embodiment of the transformation of a search inquiry processed by the system of FIG. 1.

While the path shown in FIG. 3 is able to handle a wide range of potential search inquiries, it has the drawback that the latency introduced into the search process might be too long. If the time required for a search inquiry to flow through the transformations represented in FIG. 3 is of the same order as the time required to perform a search, the compilation process might become the performance bottleneck rather than the search itself. This issue can be addressed for a wide range of likely search inquiries by maintaining a set of precompiled hardware templates that handle the most common cases. These templates may be provided and maintained either in CPU 32 memory, made available through an off-line storage medium such as a CD, or even kept in the mass storage medium 26 itself. Still further, such templates may be communicated to CPU 32 such as over a network or the Internet.

Figure 4:
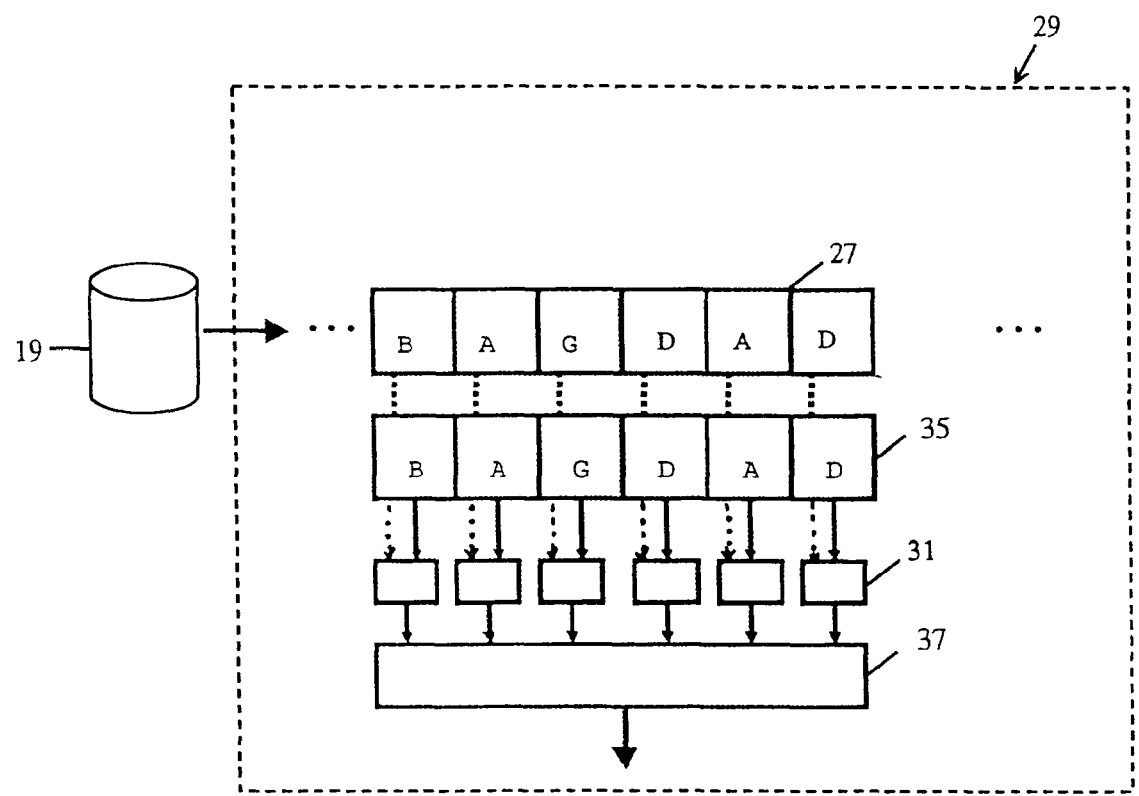
FIG. 4 is a block diagram of one embodiment of a hardware implementation of the present invention used to conduct an exact match search in a digital domain.

One embodiment of such a hardware template 29 is illustrated in FIG. 4. In particular, the data shift register 27 contains target data streaming off the head (not shown) of one or more disks 19. A compare register stores the data key for which the user wishes to match. In the example shown, the data key is "Bagdad." Fine-grained comparison logic device 31 performs element by element comparisons between the elements of the data shift register 27 and the compare register 35. The fine-grained comparison logic device 31 can be configured to be either case sensitive or case insensitive. Word-level comparison logic 37 is responsible for determining whether or not a match at the world-level occurs. In the case of a compound search inquiry, the word-level match signals are delivered to the control microprocessor 22 for evaluation thereof. A match to the compound search inquiry is then reported to the CPU 32 for further processing.

Figure 5:
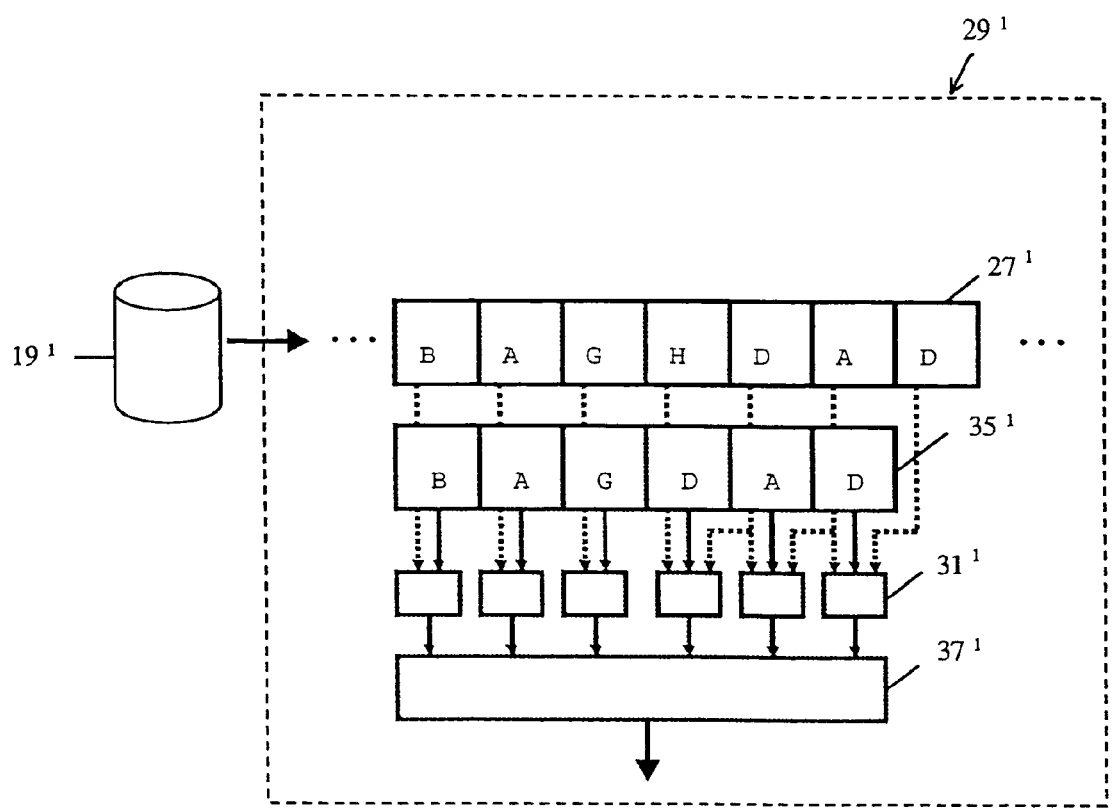
FIG. 5 is a block diagram of one embodiment of a hardware implementation of the present invention used to conduct an approximate match search in a digital domain.

One embodiment of a hardware template for conducting approximate matching is illustrated in FIG. 5. In particular, the data shift register 27' contains target data streaming off the head (not shown) of one or more disks 19'. A compare register 35' stores the data key for which the user wishes to match. In the example shown, the data key is again "Bagdad." Fine-grained comparison logic 31' performs element by element comparisons between the elements of the data shift register 27' and the compare register 21'. Again, the fine-grained comparison logic device 31' can be configured to be either case sensitive or case insensitive. The template 29' provides for alternate routing of elements in data shift register 27' to individual cells of the fine-grained comparison logic device 21'. Specifically, each cell of the fine-grained comparison logic device 31' can match more than one position in the data shift register 27' such that the compare register 21' can match both the commonly used spelling of "Baghdad" as well as the alternate "Bagdad" in shared hardware. Word-level comparison logic 37' is responsible for determining whether or not a match at the word level occurs. In the case of a compound search inquiry, the word-level match signals are delivered to the control microprocessor 22 for evaluation thereof. A match to the compound search inquiry is then reported to the CPU 32 for further processing.

The actual configuration of the hardware template will of course vary with the search inquiry type. By providing a small amount of flexibility in the hardware templates (e.g., the target data stored in the compare registers, the routing of signals from the data shift registers and compare register elements to the cells of the fine-grained comparison logic device, and the width of the word-level comparison logic), such a template can support a wide range of word matches. As a result, this diminishes the frequency with which the full search inquiry transformation represented in FIG. 3 must take place, which in turn, increases the speed of the search.

It should be noted that the data entries identified in an "approximate" match search will include the "exact" hits that would result from an "exact" search. For clarity, when the word "match" is used, it should be understood that it includes a search or a data result found through either of an approximate search or an exact search. When the phrase "approximate match" or even just "approximate" is used, it should be understood that it could be either of the two searches described above as approximate searches, or for that matter any other kind of "fuzzy" search that has a big enough net to gather target data that are loosely related to the search inquiry or in particular, data key. Of course, an exact match is just that, and does not include any result other than an exact match of the search inquiry with a high degree of correlation.

Also shown in FIG. 1 is a network interface 36 interconnecting the present invention to a network 38 which may be a LAN, WAN, Internet, etc. and to which other computer systems 40 may be connected. With this arrangement, other computer systems 40 may conveniently also access the data stored on the mass storage medium 26 through the present invention 21. More specific examples are given below. Still further as shown in FIG. 1, the elements 20-24 may themselves be packaged together and form a disk drive accelerator that may be separately provided as a retrofit device for adapting existing pc's having their own disk drives with the advantages of the present invention. Alternately, the disk drive accelerator may also be offered as an option on a hard drive and packaged in the same enclosure for an external drive or provided as a separate pc board with connector interface for an internal drive. Still further alternatively, the disk drive accelerator may be offered as an option by pc suppliers as part of a pc ordered by a consumer, business or other end user. Still another embodiment could be that of being offered as part of a larger magnetic mass storage medium, or as an upgrade or retrofit kit for those applications or existing installations where the increased data handling capability could be used to good advantage.

Figure 6:
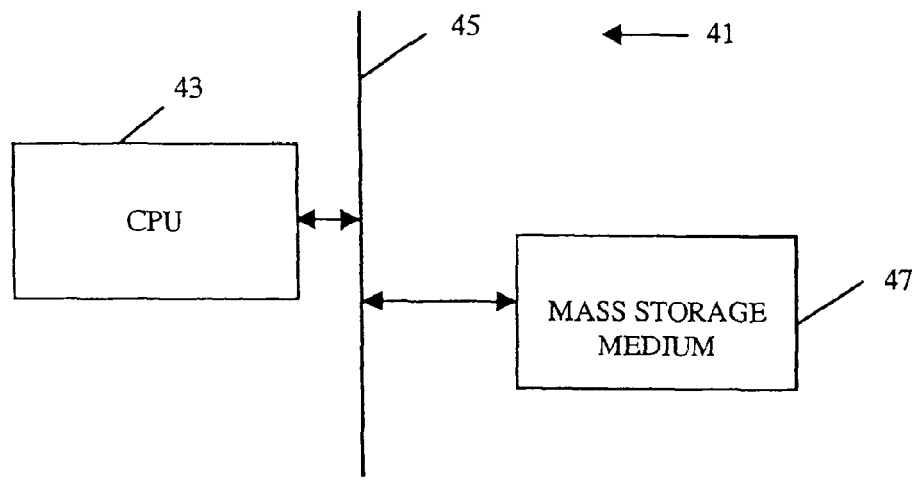
FIG. 6 is a block diagram depicting the implementation of the present invention in a stand-alone configuration.
Figure 7:
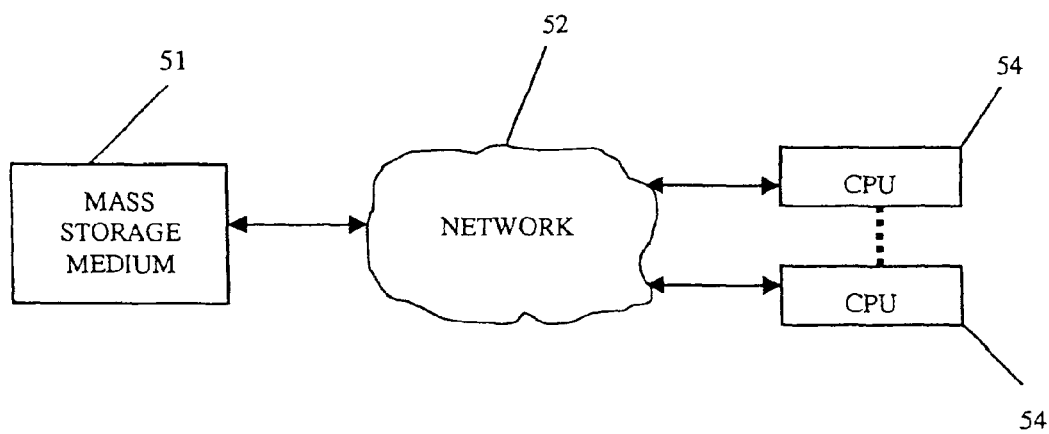
FIG. 7 is a block diagram depicting the present invention implemented as a shared remote mass storage device across a network.
Figure 8:
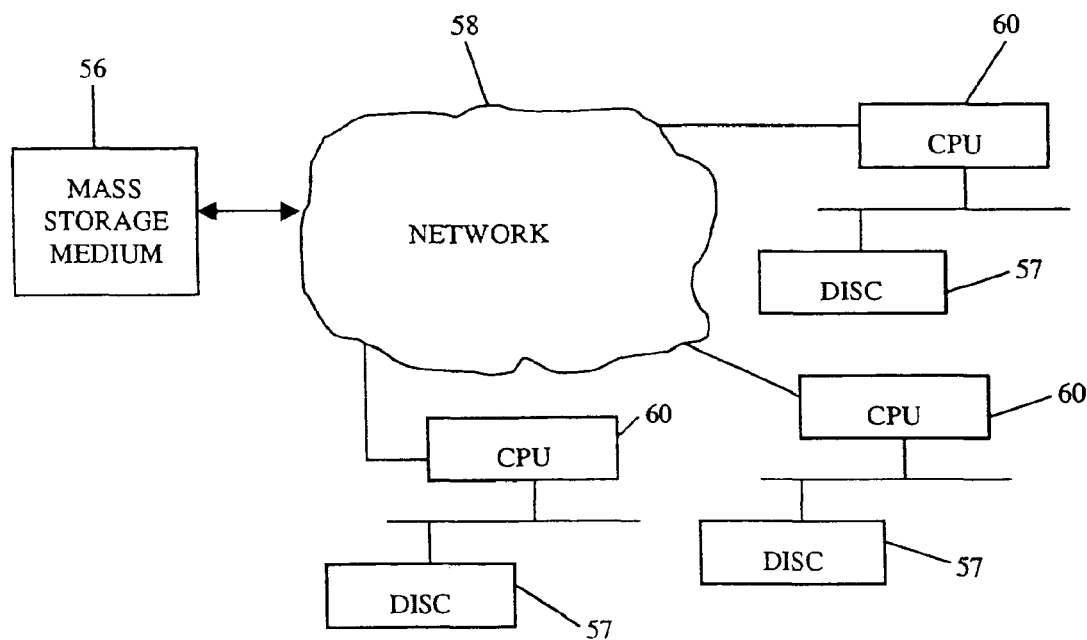
FIG. 8 is a block diagram depicting the present invention as a network attached storage device (NASD)

As shown in FIGS. 6-8, the present invention may be implemented in a variety of computer and network configurations. As shown in FIG. 6, the present invention may be provided as part of a stand-alone computer system 41 comprising a CPU 43 connected to a system bus 45 which then accesses a mass storage medium 47 having the invention as disclosed herein.

As shown in FIG. 7, the mass storage medium 51 coupled with the present invention may be itself connected directly to a network 52 over which a plurality of independent computers or CPU's 54 may then access the mass storage medium 51. The mass storage medium 51 may itself be comprised of a bank of hard disk drives comprising a RAID, disk farm, or some other massively parallel memory device configuration to provide access and approximate matching capabilities to enormous amounts of data at significantly reduced access times.

As shown in FIG. 8, a mass storage medium 56 coupled with the present invention may be connected to a network 58 as a network attached storage device (NASD) such that over the network 58 a plurality of stand-alone computers 60 may have access thereto. With such a configuration, it is contemplated that each mass storage medium, represented for illustrative purposes only as a disk 57, would be accessible from any processor connected to the network. One such configuration would include assigning a unique IP address or other network address to each mass storage medium.

The configurations as exemplified by those shown in FIGS. 1 and 6-8 represent only examples of the various computer and network configurations with which the present invention would be compatible and highly useful. Others would be apparent to those having skill in the art and the present invention is not intended to be limited through the examples as shown herein which are meant to be instead illustrative of the versatility of the present invention.

Figure 9:
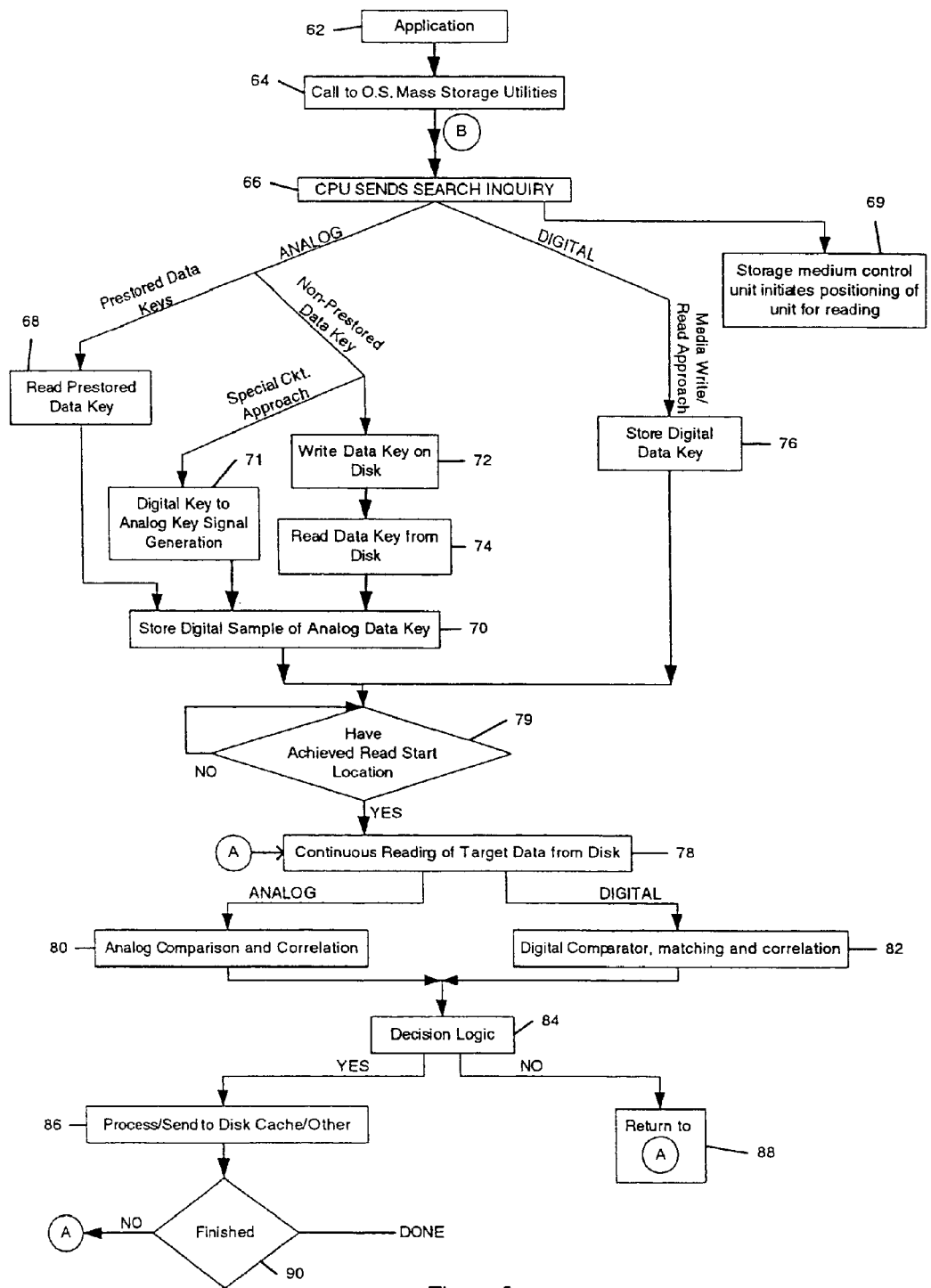
FIG. 9 is a flowchart detailing the logical steps in the inventive method for searching and retrieving data from a magnetic storage medium.

As shown in FIG. 9, the method of the present invention for use in exact or approximate matching is described alternatively with respect to whether an analog or digital data domain is being searched. However, beginning at the start of the method, a CPU performs certain functions during which it may choose to access target data stored in a mass storage medium. Typically, the CPU runs a search inquiry application 62 which may be representative of a DNA search, an Internet search, an analog voice search, a fingerprint search, an image search, or some other such search during which an exact or approximate match to target data is desired. The search inquiry contains directives specifying various parameters which the disk control unit 28 and the re-configurable logic device 20 must have to properly obtain the data key from the mass storage medium 26. Examples of parameters include but are not limited to the following: the starting location for scanning the storage device; the final location after which (if there is not match) scanning is terminated; the data key to be used in the scanning; a specification of the approximate nature of the matching; and what information should be returned when a match occurs. The sort of information that can be returned includes the address of the information where the match was found, or a sector, record, portion of record or other data aggregate which contains the matched information. The data aggregate may also be dynamically specified in that the data returned on a match may be specified to be between bounding data specifiers with the matched data contained within the bounding field. As the example in FIG. 5 shows, looking for the word "bagdad" in a string of text might find the approximate match, due to misspelling, of the word "Baghdad", and return a data field which is defined by the surrounding sentence. Another query parameter would indicate whether the returned information should be sent to the system or input/output bus 34, or the disk cache 30.

Referring back to FIG. 9, the search inquiry will typically result in the execution of one or more operating system utilities. As an example of a higher level utility command, for the UNIX operating system, this could be modified versions of glimpse, find, grep, apropos, etc. These functions cause the CPU to send commands 66 such as search, approximate search, etc., to the re-configurable logic device 21 with relevant portions of these commands also being sent to the disk controller 28 to, for example, initiate any mass storage medium positioning activity 69 that is later required for properly reading target data from the mass storage medium.

At this point, depending upon the particular methodology desired to be implemented in the particular embodiment of the invention, it would be necessary that an analog or digital data key is determined. This data key, which can be either exact or approximate for a text search, corresponds to the data being searched for. For an analog data key, it may either be pre-stored such as in the mass storage medium, developed using dedicated circuitry, or required to be generated. Should the analog data key be pre-stored, a send pre-stored data key step 68 would be performed by the microprocessor 22 (see FIG. 1) which would transmit the data key in digital and sampled format to the re-configurable logic device 20 as shown in step 70. Alternatively, should the analog data key not be pre-stored, it can be developed using one of a number of mechanisms, two of which are shown in FIG. 9. In one, the microprocessor 22 would write the data key on the magnetic mass storage medium as at step 72 and then next read the data key as at step 74 in order to generate an analog signal representation of the data key. In another, as at step 71, the digital version of the data key received from the CPU would be converted using appropriate digital to analog circuitry to an analog signal representation which would in turn be appropriately sampled. The data key would then next be stored as a digital sample thereof as in step 70. Should a digital data key be used, it is only necessary that the microprocessor 22 store the digital data key as at step 76 in the compare register of the re-configurable logic device. It should be understood that depending upon the particular structures desired to be included for each re-configurable logic device, the data key may reside in either or all of these components, it merely being preferable to ultimately get the appropriate digital format for the data key into the re-configurable logic device 21 for comparison and correlation.

Next, after the mass storage medium 26 reaches its starting location as at 79, the target data stored on the mass storage medium is continuously read as at step 78 to generate a continuous stream signal representative of the target data. Should an analog data key have been used, this analog data key may then be correlated with an analog read of the target data from the mass storage medium 26 as at step 80.

While the inventors contemplate that any of many prior art comparators and correlation circuitry could be used, for present purposes the inventors suggest that a digital sampling of the analog signal and data key could be quite useful for performing such comparison and calculating the correlation coefficient, as explained below. It is noted that this analog signal generated from reading the target data from mass storage medium 26 may be conveniently generated by devices in the prior art from the reading of either analog or digital data, it not being necessary that a digital data key be used to match digital target data as stored in mass storage medium 26. Alternatively, a correlation step 82 may be performed by matching the digital data key with a stream of digital target data as read from the mass storage medium 26. It should be noted that the data key may reflect the inclusion of approximate information or the re-configurable logic device 21 may be programmed to allow for same. Thus, correlating this with target data read from the mass storage medium enables approximate matching capabilities.

Referring back to FIG. 9, decision logic 84 next makes an intelligent decision as to whether a portion of the target data approximately matches or does not approximately match the data key. Should a match be found, then the target data is processed as at step 86 and the key data requested by the search inquiry is sent to a disk cache 30, directly onto system bus 34, or otherwise buffered or made available to a CPU 32, network interface 36, or otherwise as shown in FIGS. 1, and 6-8. A logical step 88 is preferably included for returning to the continuous reading of target data from the mass storage medium 26, indicating something like a "do" loop. However, it should be understood that this is a continuous process and that target data is processed from the mass storage medium 26 as a stream and not in individualized chunks, frames, bytes, or other predetermined portions of data. While this is not precluded, the present invention preferably allows a data key to be in essence "slid" over a continuously varying target data read signal such that there is no hesitation in reading target data from the mass storage medium 26. There is no requirement to synchronize reading to the start or end of any multi-bit data structure, or any other intermediate steps required to be performed as the target data is compared continuously "on the fly" as it is read from the mass storage medium 26. Eventually, the data access is completed as at step 90 and the process completed.

Figure 10:
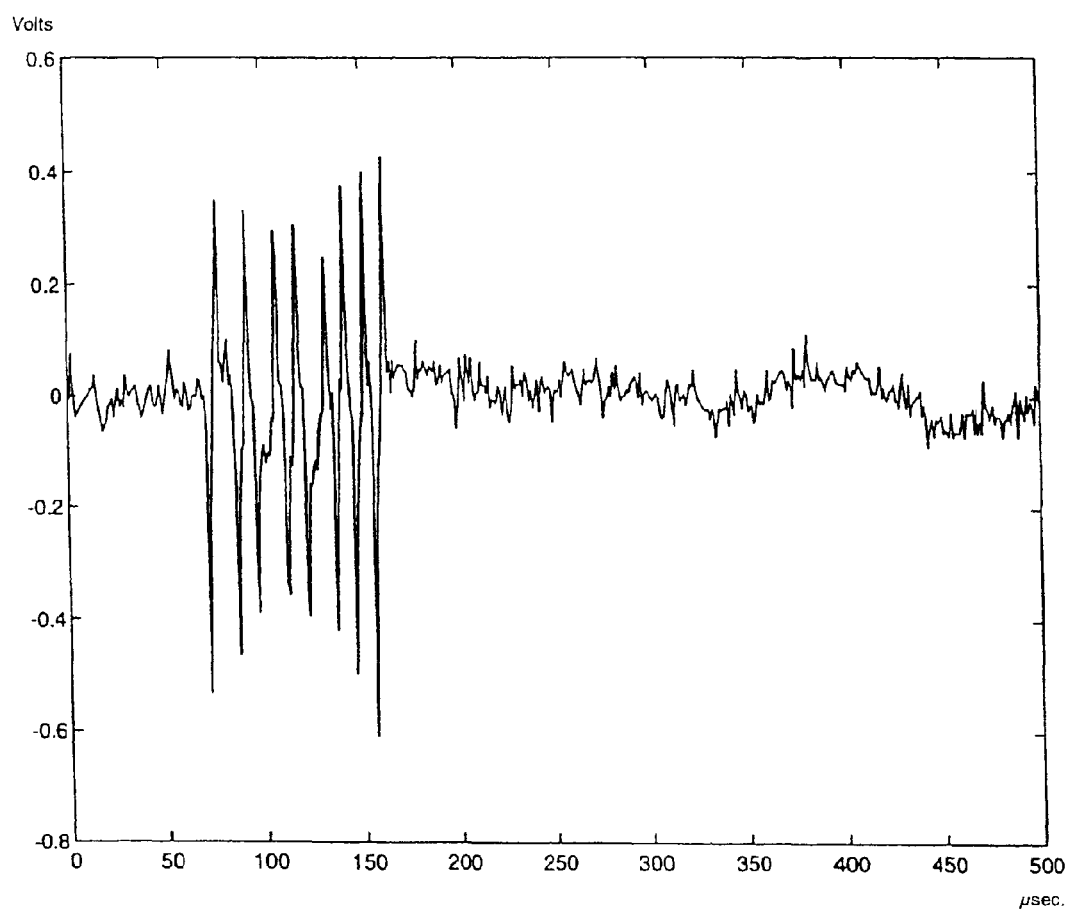
FIG. 10 is a graphical representation of an analog signal as might be used as a data key.
Figure 11:
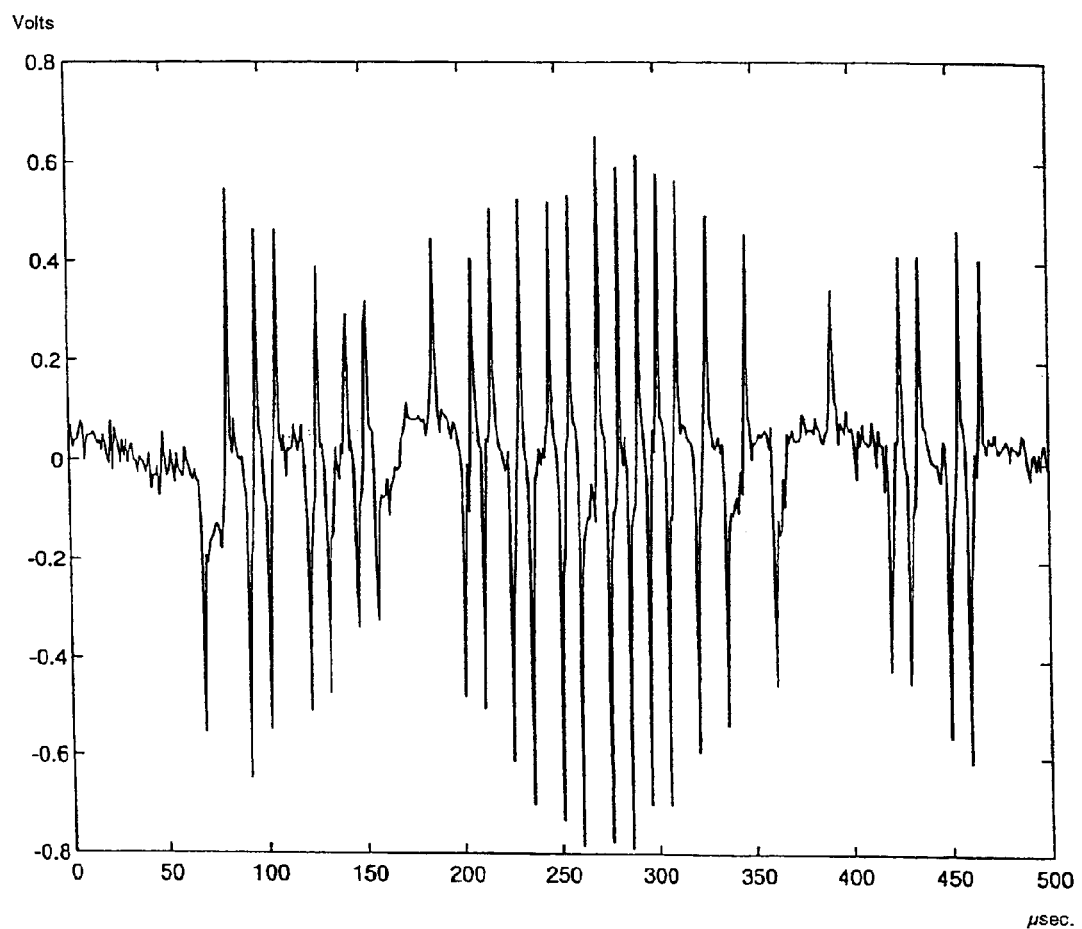
FIG. 11 is a graphical representation of an analog signal representing the continuous reading of data from a magnetic storage medium in which the data key is present.

The inventors herein have preliminarily tested the present invention in the analog domain and have generated preliminary data demonstrate its operability and effectiveness. In particular, FIG. 10 is a graphical representation of a measured analog signal output from a read/write head as the read/write head reads a magnetic medium on which is stored a 10-bit digital data key. As shown therein, there are peaks in the analog signal which, as known in the art, represents the true analog signal generated by a read/write head as target data is read from a magnetic medium such as a hard disk. The scales shown in FIG. 10 are volts along the vertical axis and tenths of microseconds along the horizontal axis. As shown in FIG. 11, an analog signal is generated, again by a read/write head, as target data is read from a pseudo-random binary sequence stored in a test portion of a magnetic medium. The read signal does not provide an ideal square wave output when examined at this level.

Figure 12:
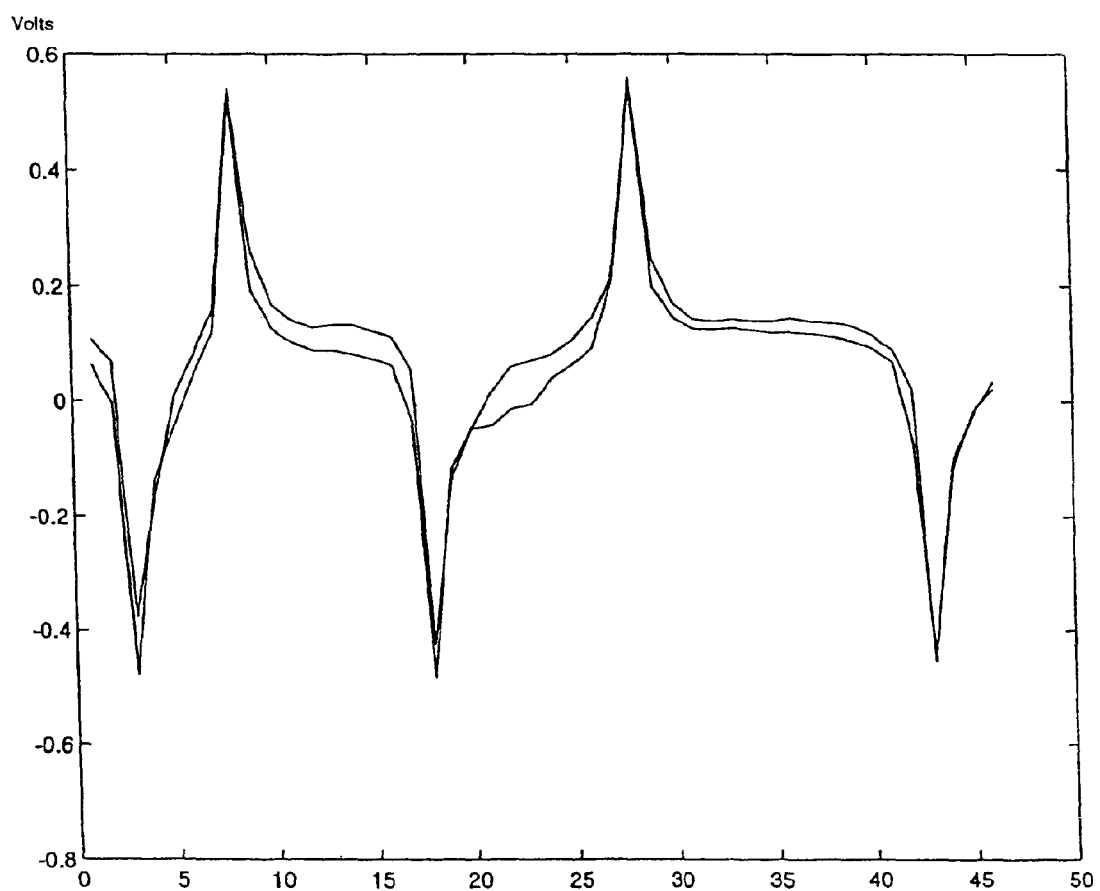
FIG. 12 is a graphical representation of the signal of FIG. 10 overlying and matched to the signal of FIG. 11.

FIG. 12 is a graphical representation, with the horizontal scale expanded, to more specifically illustrate the overlap between approximately two bits of the 8-bit data key and the corresponding two bits of target data found in the pseudo-random binary sequence encoded at a different location on the disk or magnetic medium.

Figure 13:
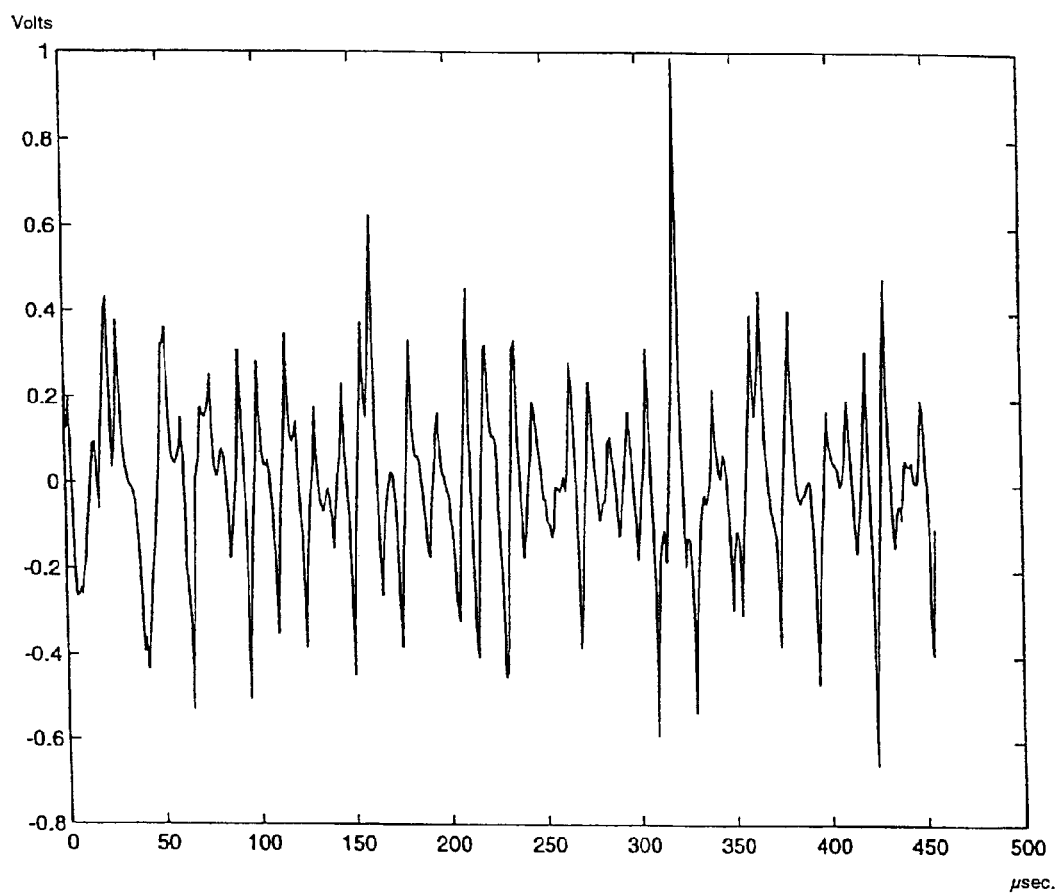
FIG. 13 is a graphical representation of a correlation function calculated continuously as the target data in the magnetic storage medium is scanned and compared with the data key.

FIG. 13 is a graphical representation of a correlation coefficient calculated continuously as the comparison is made between the data key and the continuous reading of target data from the hard disk. This correlation coefficient is calculated by sampling the analog signals at a high rate and using prior art signal processing correlation techniques. One such example may be found in Spatial Noise Phenomena of Longitudinal Magnetic Recording Media by Hoinville, Indeck and Muller, IEEE Transactions on Magnetics, Volume 28, no. 6, November 1992, the disclosure of which is incorporated herein by reference. A prior example of a reading, comparison, and coefficient calculation method and apparatus may be found in one or more of one of the co-inventor's prior patents, such as U.S. Pat. No. 5,740,244, the disclosure of which is incorporated herein by reference. The foregoing represent examples of devices and methods which may be used to implement the present invention, however, as mentioned elsewhere herein, other similar devices and methods may be likewise used and the purposes of the invention fulfilled.

As shown in FIG. 13, at approximately the point labeled 325, a distinct peak is noted at approximately 200 microseconds which approaches 1 Volt, indicating a very close match between the data key and the target data. FIG. 10 is also illustrative of the opportunity for approximate matching which is believed to be a powerful aspect of the present invention. Looking closely at FIG. 13, it is noted that there are other lesser peaks that appear in the correlation coefficient. Thus, if a threshold of 0.4 Volts were established as a decision point, then not only the peak occurring which approaches 1 would indicate a match or "hit" but also another five peaks would be indicative of a "hit". In this manner, a desired coefficient value may be adjusted or predetermined as desired to suit particular search parameters. For example, when searching for a particular word in a large body of text, lower correlation values may indicate the word is present but misspelled.

Figure 14:
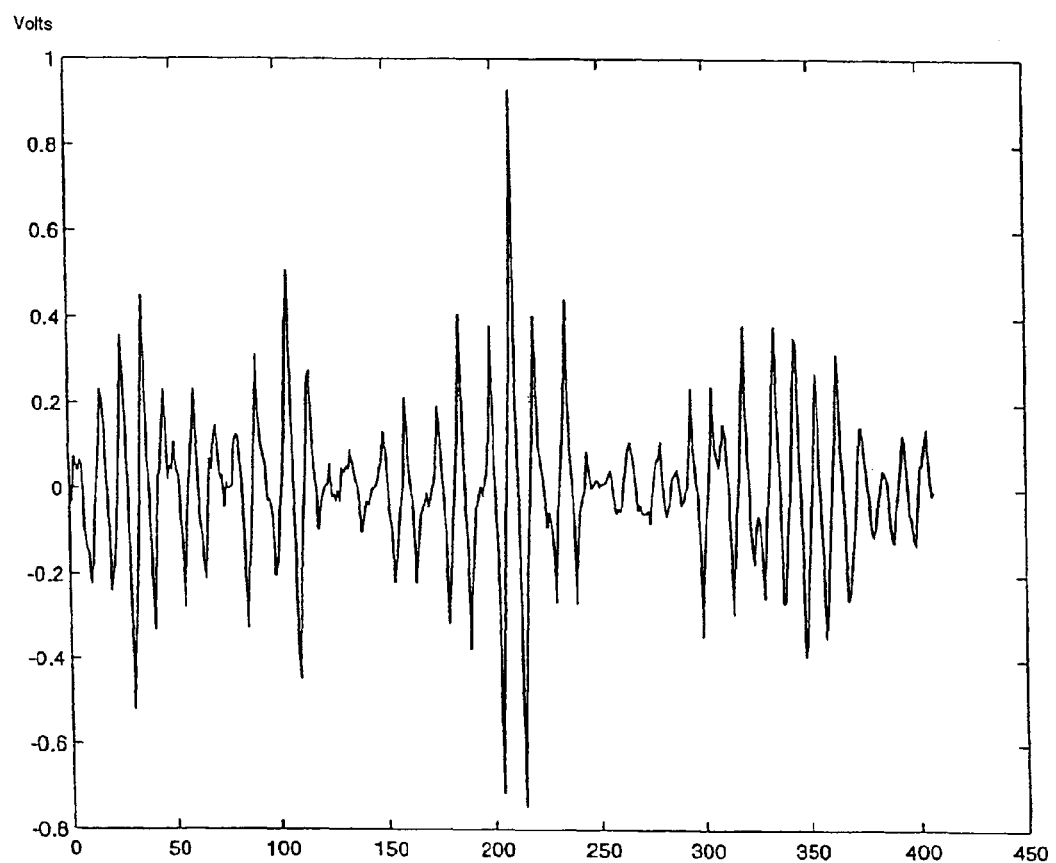
FIG. 14 is a graphical representation of a correlation function as the data key is continuously compared with a signal taken from reading a different set of target data from the magnetic storage medium but which also contains the data key.

FIG. 14 depicts the continuous calculation of a correlation coefficient between the same 8-bit data key but with a different target data set. Again, a single match is picked up at approximately 200 microseconds where the peak approaches 1 Volt. It is also noted that should a lower threshold be established additional hits would also be located in the target data.

Figure 15:
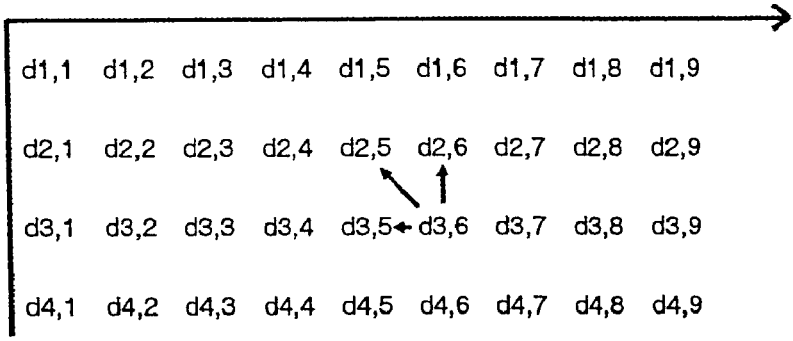
FIG. 15 is one embodiment of a table generated by the present invention for use in performing sequence matching operations.

As previously mentioned, the present invention is also capable of performing sequence matching searches. With reference to FIG. 15, a table 38 is generated by the re-configurable logic device 20 to conduct such a search. Specifically, $p_1 p_2 p_3 p_4$ represents the data key, p, or desired sequence to be searched. While the data key of FIG. 15 only shows four characters, this is for illustrative purposes only and it should be appreciated that a typical data key size for sequence searching is on the order of 500-1000, or even higher. The symbols $t_1, t_2, t_3 \ldots t_9$ represent the target data, t, streaming off of the mass storage medium 26. Again, while only nine (9) characters of such data are shown, it should be appreciated that the typical size of the mass storage medium 26 and thus the target data streaming off of it can typically be in the range of several billion characters. The symbols $d_{i,j}$ represent the edit distance at position i in the data key and position j in the target data. It is assumed that the data key is shorter relative to the target data, although it is not required to be so. There may be a set of known (constant) values for an additional row (d0,j) and column (di,0) not shown in FIG. 15.

The values for di,j are computed by the re-configurable logic device 20 using the fact that di,j is only a function of the following characters: (1) pi, (2) tj, (3) di−1,j−1, (4) di−1,j, and (5) di,j−1. This is illustrated in FIG. 15 with respect to the position d3,6 by showing its dependency on the values of d2,5 and d2,6 and d3,5 as well as p3 and t6. In one embodiment, the values for di,j are computed as follows:

$$di,j=\max[di,j-1+A;\ di-1,j+A;\ di-1,j-1+Bi,j],$$

where A is a constant and Bi,j is a tabular function of pi and tj. The form of the function, however, can be quite arbitrary. In the biological literature, B is referred to as the scoring function. In the popular database searching program BLAST, scores are only a function of whether or not pi=tj. In other contexts, such as for amino acid sequences, the value of B is dependent upon the specific characters in p and t.

Figure 16:
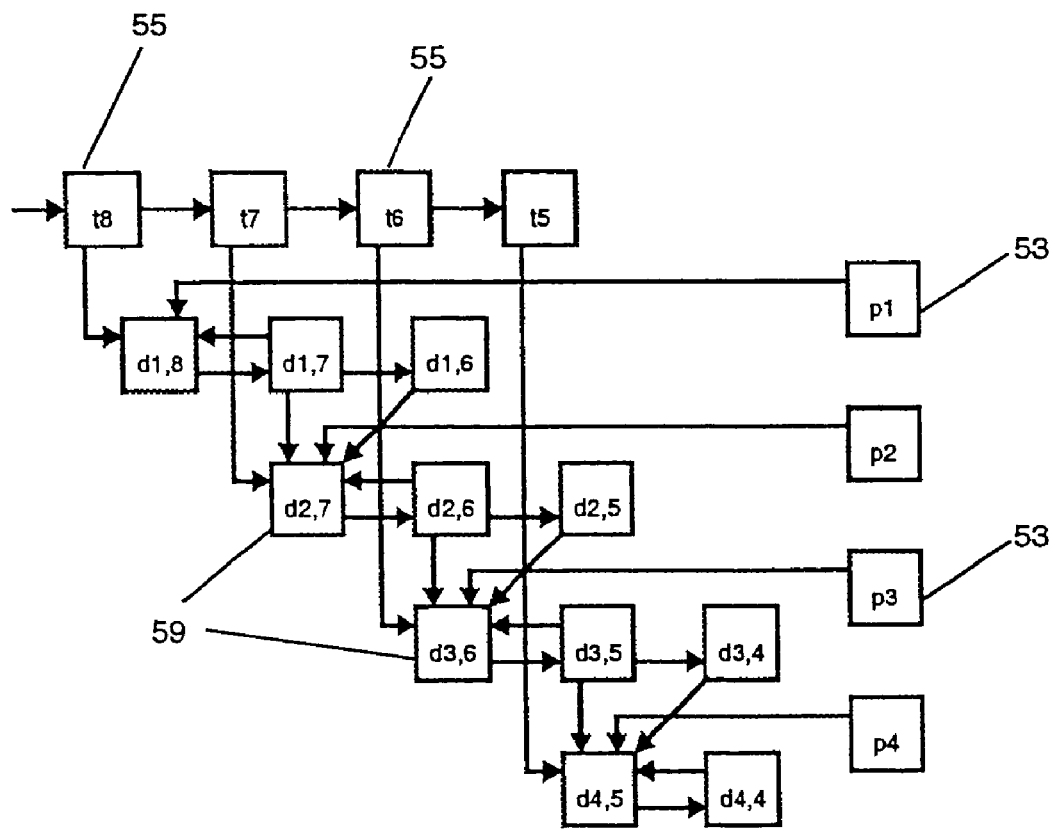
FIG. 16 is a block diagram of one embodiment of a systolic array architecture used by the present invention for computing the values of the table of FIG. 15.

FIG. 16 shows one embodiment of a systolic array architecture used by the present invention to compute the values in the table 38 of FIG. 15. The characters of the data key are stored in the column of data registers 53, while the characters of the target data streaming off of the mass storage medium 26 are stored in the data shift registers 55. The values of di,j are stored in the systolic cells 59 which themselves are preferably FPGA's.

Figure 17:
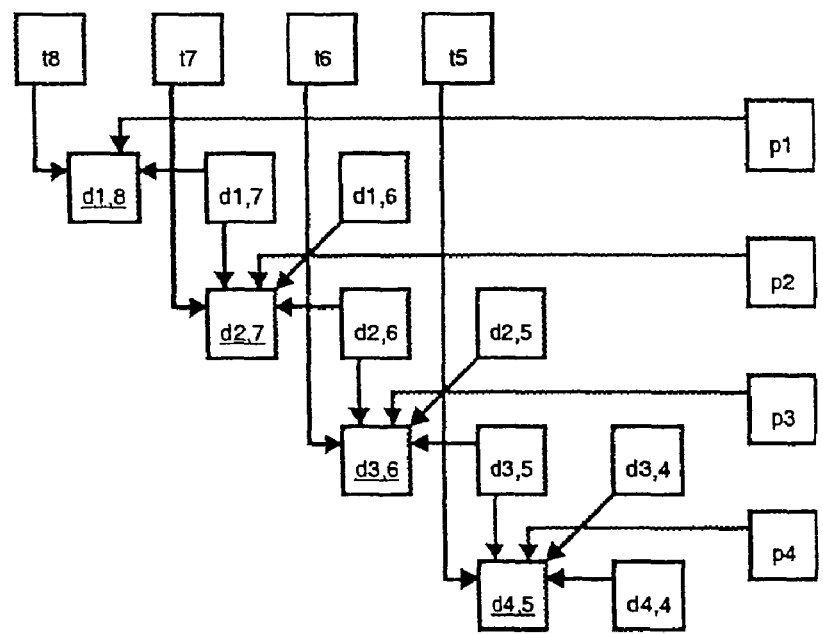
FIGS. 17 and 18 are block diagrams of the systolic array architecture of FIG. 15 in operation during the combinational and latch part of the clock cycle, respectively, of the system of FIG. 1.
Figure 18:
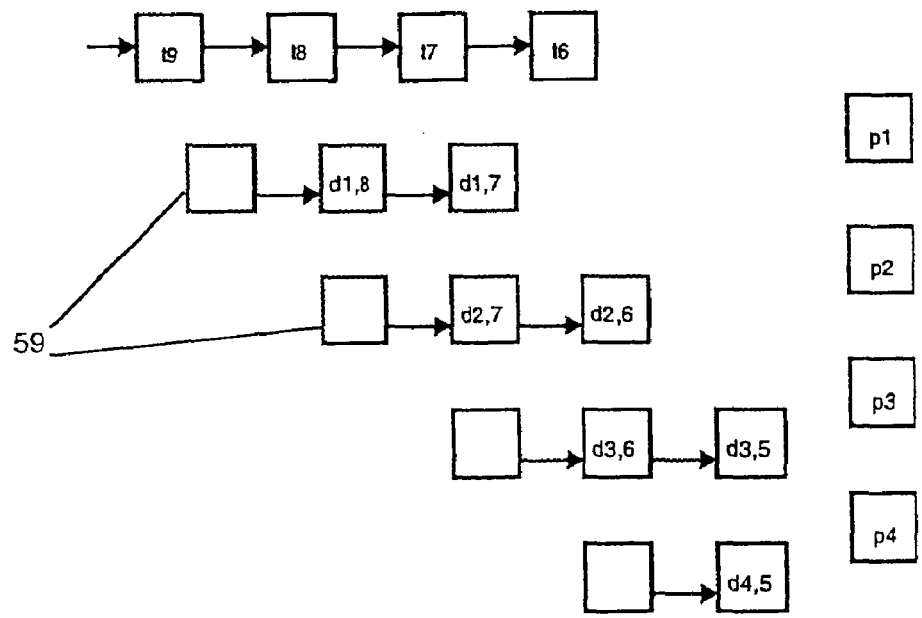

The operation of the array of FIG. 16 will now be illustrated using FIGS. 17 and 18. As shown in FIG. 17, in the first (i.e., combinational) part of the clock cycle of the system, the four underlined values are computed. For example, the new value d3,6 is shown to depend upon the same five values illustrated earlier in FIG. 15. As shown in FIG. 18, in the second (i.e., latch) part of the clock cycle, all the characters in di,j and tj are shifted one position to the right. A comparator 61 is positioned at each diagonal cell of the d array and determines when the threshold has been exceeded.

The sequence matching operation will now be described with reference to FIGS. 19-22 with respect to the following example:
 key=axbacs
 target data=pqraxabcstvq
 A=1
 B=2, if i=j
 B=−2 if i=j
From these variables, the table of FIG. 19 is generated by the re-configurable logic device 20. Assuming a pre-determined threshold of "8", the re-configurable logic device 20 will recognize a match at d6,9.

Figure 20:
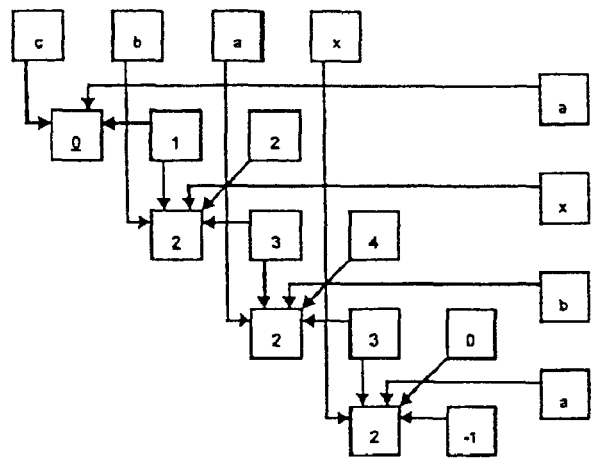
FIG. 20 is a block diagram of the systolic array architecture of FIG. 16 for the example of FIG. 19.
Figure 21:
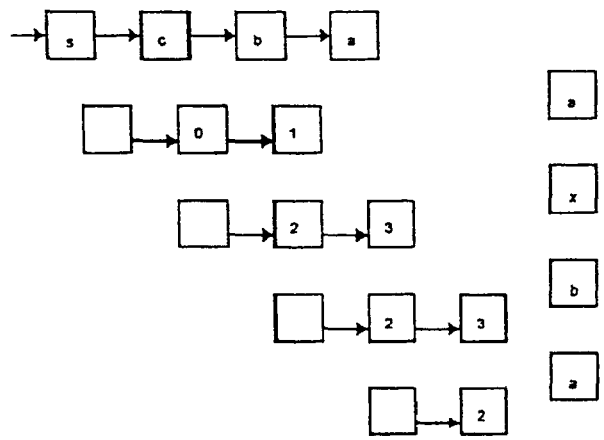
Figure 22:
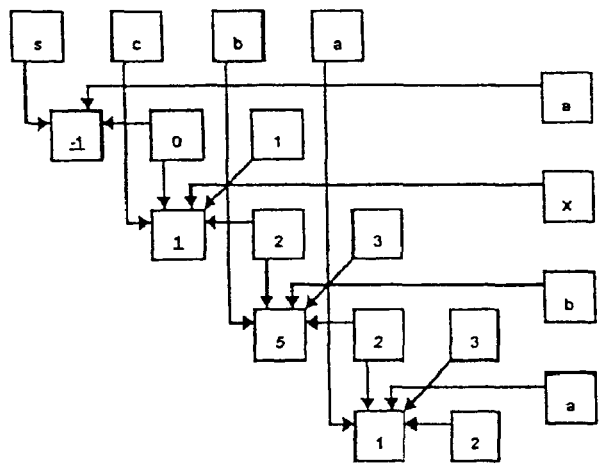

A portion of the synthesis arrays representing the values present in FIGS. 16-18 for this example are shown in FIGS. 20-22, respectively. A match is identified by the re-configurable logic device 20 when the value on any row exceeds a predetermined threshold. The threshold is set based on the desired degree of similarity desired between the data key and the target data stored in mass memory device 26. For example, in the case of an exact match search, the data key and target data must be identical. The match is then examined by the CPU 32 via a traceback operation with the table of FIG. 19. Specifically a "snapshot" of the table is sent to the CPU 32 at a predetermined time interval to assist in traceback operations once a match is identified. The interval is preferably not too often to overburden the CPU 32, but not so infrequent that it takes a lot of time and processing to recreate the table. To enable the CPU 32 to perform the traceback operation, it must be able to recreate the d array in the area surrounding the entry in the table that exceeded the threshold. To support this requirement, the systolic array can periodically output the values of a complete column of d ("a snapshot") to the CPU 32. This will enable the CPU 32 to recreate any required portion of d greater than the index j of the snapshot.

Figure 23:
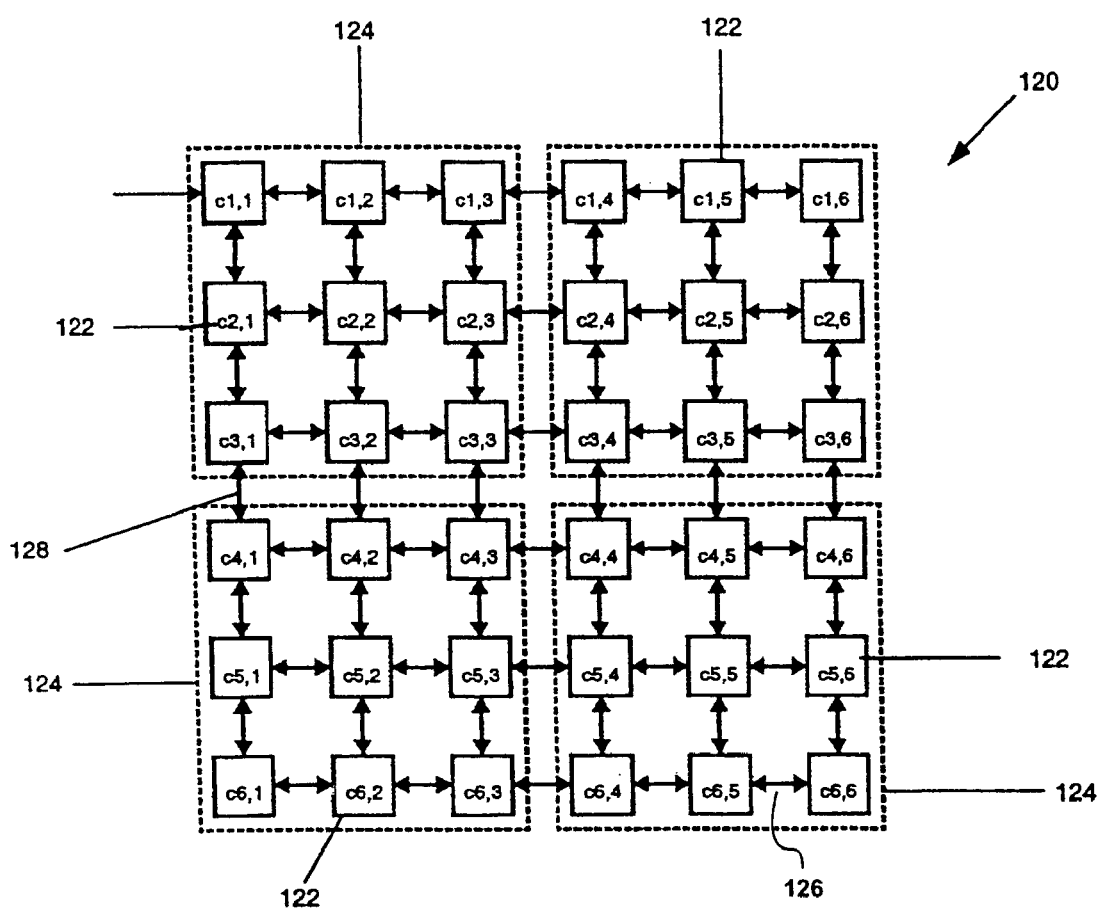
FIG. 23 is a block diagram of one embodiment of a systolic array architecture used by the present invention in performing image matching operations.

Many matching applications operate on data representing a two dimensional entity, such as an image. FIG. 23 illustrates a systolic array 120 of re-configurable logic devices 20, preferably FPGA's, which enables matches on two dimensional data. The individual cells 122 each hold one pixel of the image for which the user is desiring to match (the image key) and one pixel of the image being searched (the target image). For images of sufficiently large size, it is likely they will not all fit into one re-configurable logic chip 124. In such cases, a candidate partitioning of cells to chips is shown with the dashed lines, placing a rectangular subarray of cells in each chip 124. The number of chip-to-chip connections can be minimized by using a subarray that is square (i.e., same number of cells in the vertical and horizontal dimension). Other more complicated arrangements are shown below.

Figure 24:
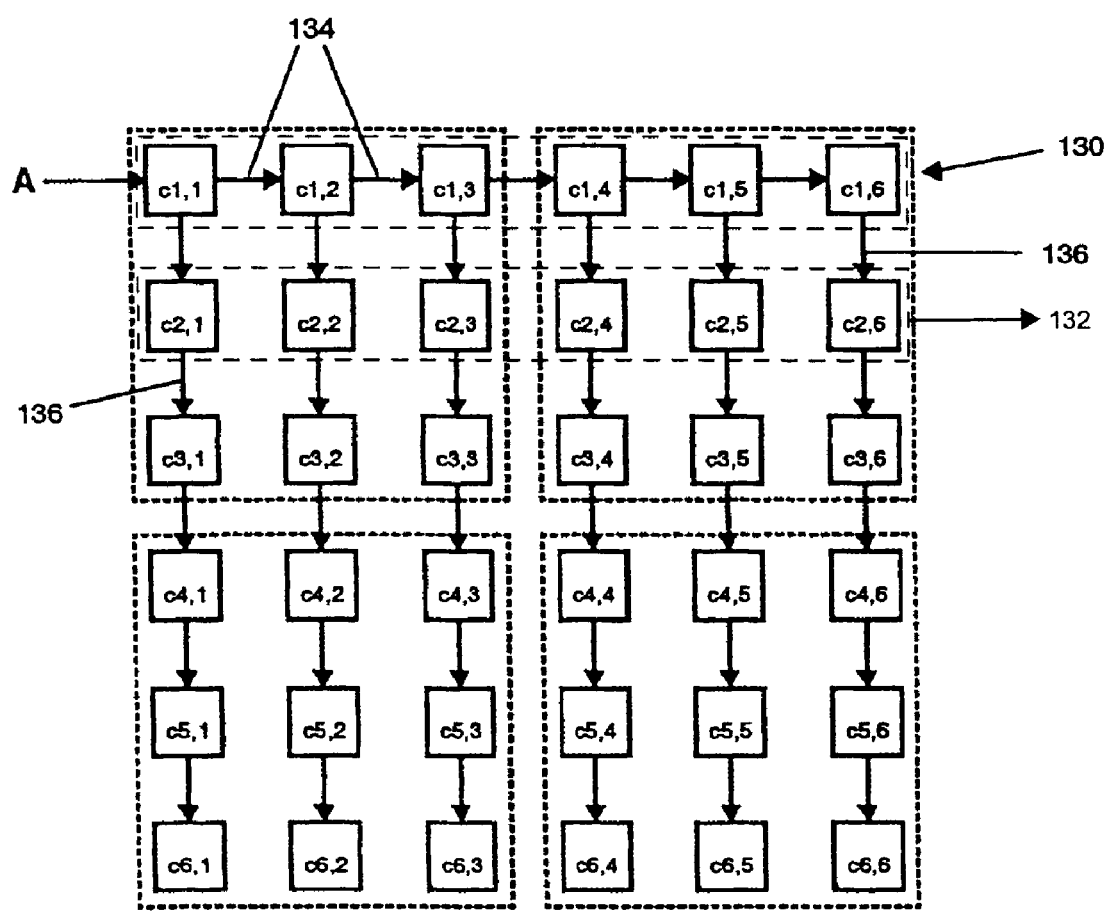
FIG. 24 is a block diagram of another arrangement for the systolic array architecture in performing image matching operations.

Loading of the target image into the array 120 is explained using FIG. 24. Individual rows of each target image streaming off the mass magnetic medium 26, shown generally as point A, into the top row 130 of the array via the horizontal links 134 connecting each cell. With such a configuration, the top row 130 operates as a data shift register. When the entire row 130 is loaded, the row is shifted down to the next row 132 via the vertical links 136 shown in each column. Once the entire image is loaded into the array, a comparison operation is performed, which might require arbitrary communication between neighboring cells. This is supported by both the horizontal and vertical bi-directional links 126 and 128, respectively, shown in FIG. 23.

Figure 28:
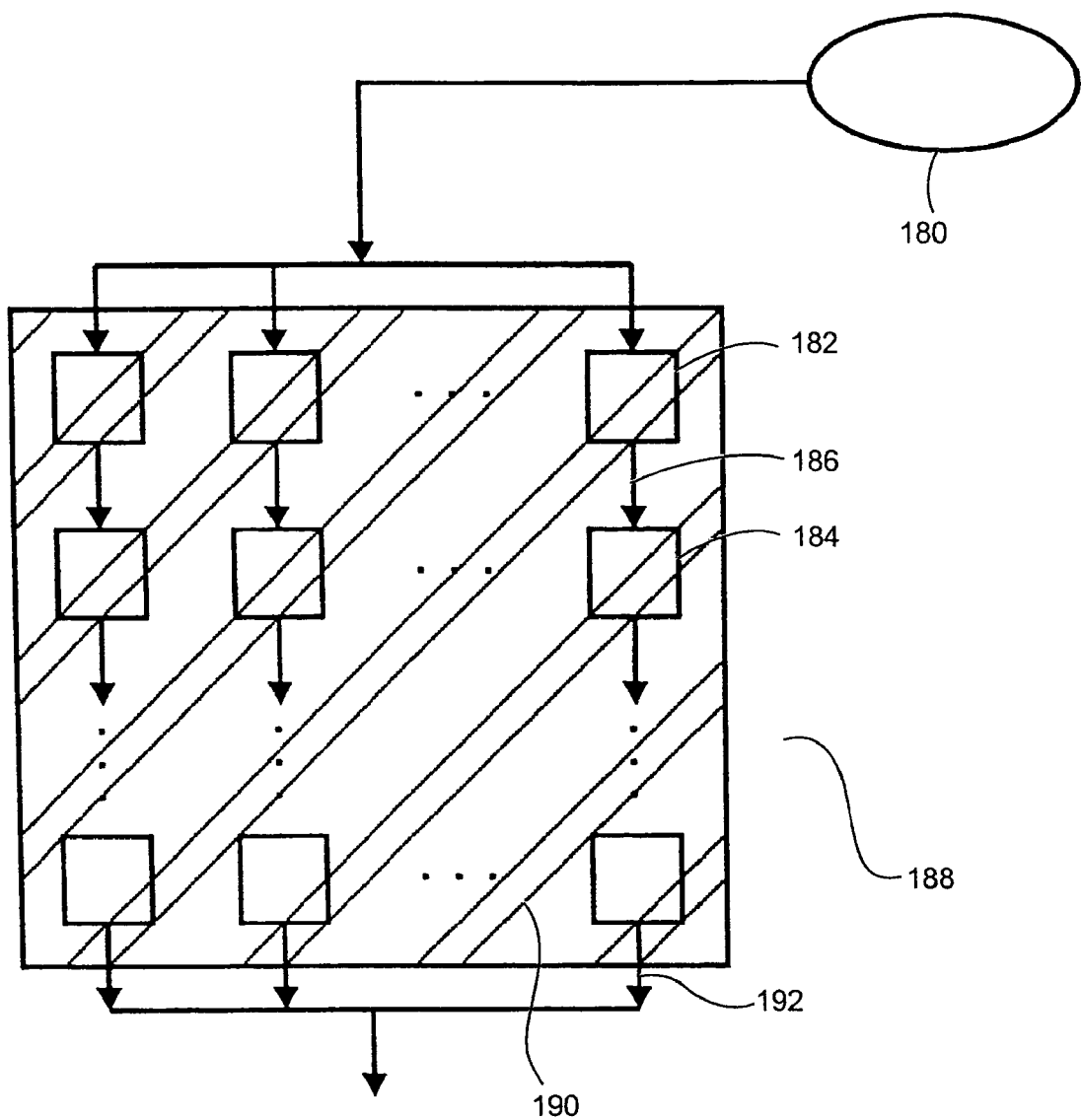
FIG. 28 is a block diagram showing a more complex arrangement of FPGA's.

Although for simplicity purposes the individual bi-directional links 126 and 128 are shown simply in FIGS. 23 and 24, FIG. 28 shows the flexibility for implementing a much more complex set of bi-directional links. As shown in FIG. 28, data may be communicated from a mass storage medium 180 and be input to a first row of a plurality of cells 182, with each cell of the first row having a direct link to the corresponding cell 184 below it in a second row of cells with a simple link 186, and so on throughout the array 188 of cells. Overlying the array 188 of cells is a connector web 190 which provides direct connectivity between any two cells within the array without the need for transmission through any intervening cell. The output of the array 188 is represented by the sum of the exit links 192 at the bottom of the array 188. It should be understood that each cell in the array may be comprised of an FPGA, each one of which preferably has a re-configurable logic element corresponding to element 20 in FIG. 1, or any one of which may have a re-configurable logic element 20 as well as a data shift register 24, or any one of which may have the entirety of re-configurable logic device 21.

Figure 25:
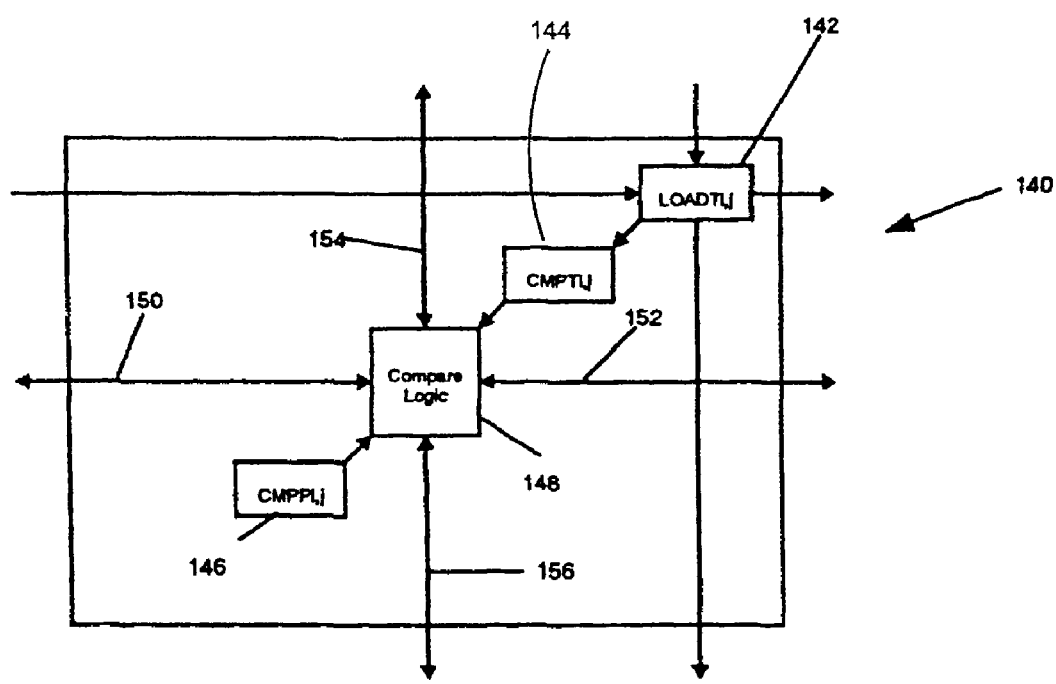
FIG. 25 is a block diagram of one embodiment of an individual cell of the systolic array shown in FIG. 23.

One embodiment for the individual cells of array 120 is illustrated in FIG. 25. The cell 140 includes a pixel register 142, LOADTi,j, which contains the pixels of the target image currently being loaded into the array. A register, 144 CMPTi,j, contains a copy of the pixel register 142 once the complete target image has been loaded. This configuration enables the last target image loaded to be compared in parallel with the next target image being loaded, essentially establishing a pipelined sequence of load, compare, load, compare, etc. A register 146, CMPPi,j, contains the pixels of the image key to be used for comparison purposes, and the compare logic 148 performs the matching operation between register 144 and register 146. The compare logic 148 may include the ability to communicate with the neighboring cells to the left, right, up, and down shown generally as 150, 152, 154, and 156, respectively, to allow for complex matching functions.

Figure 26:
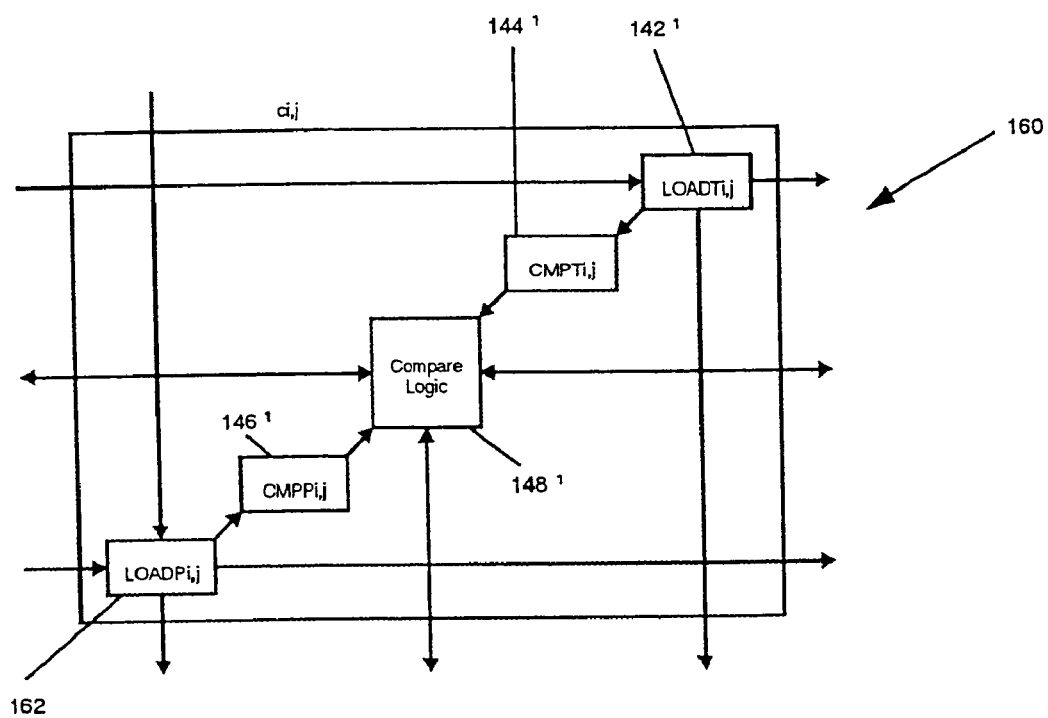
FIG. 26 is a block diagram of another embodiment of an individual cell of the systolic array shown in FIG. 23.

Another embodiment for the individual cells of array 120 of FIG. 23 is illustrated in FIG. 26. The cell 140 of FIG. 25 has been augmented to support simultaneous loading of the image key and the target image. In particular, the cell 160 includes the same components of the cell 140, but adds a new register 162, LOADPi,j, which is used to load the image key, and is operated in the same manner as register 142. With such a configuration, if one disk read head of the mass storage medium 26 is positioned above the image key, and a second disk read head is positioned above the target image, they can both flow off the disk in parallel and be concurrently loaded into the array 160.

The operation performed within the compare logic block can be any function that provides a judgment as to whether or not there are significant differences between the target image and the image key. An example includes cross-correlations across the entire image or sub-regions of the image as described in John C. Russ, *The Image Processing Handbook*, $3^{rd}$ edition, CRC Press 1999, which is incorporated herein by reference.

The present invention is also capable of performing data reduction searching. Such searching involves matching as previously described herein, but includes summarizing the matched data in some aggregate form. For example, in the financial industry, one might want to search financial information to identify a minimum, maximum, and latest price of a stock. A re-configurable logic device for computing such aggregate data reductions is illustrated as 100 in FIG. 27. Here, a data shift register 102 reads target data from a mass storage medium containing stock price information. In the example shown, three data reduction searches are shown, namely calculating the minimum price, the maximum price, and the latest price. As target data is fed into the data shift register 102, decision logic computes the desired data reduction operation. In particular, the stock price is fed to a minimum price comparator 110 and maximum price comparator 112 and stored therein. Each time a stock price is fed to comparator 110, it compares the last stored stock price to the stock price currently being fed to it and whichever is lower is stored in data register 104. Likewise, each time a stock price is fed to comparator 112, it compares the last stored stock price to the stock price currently being fed to it and whichever is higher is stored in data register 106. In order to compute the latest price, the stock price is fed into a data register 108 and the current time is fed into a comparator 114. Each time a time value is fed into comparator 114, it compares the last stored time with the current time and which ever is greater is stored in data register 116. Then, at the end of the desired time interval for which a calculation is being made, the latest price is determined.

Figure 27:
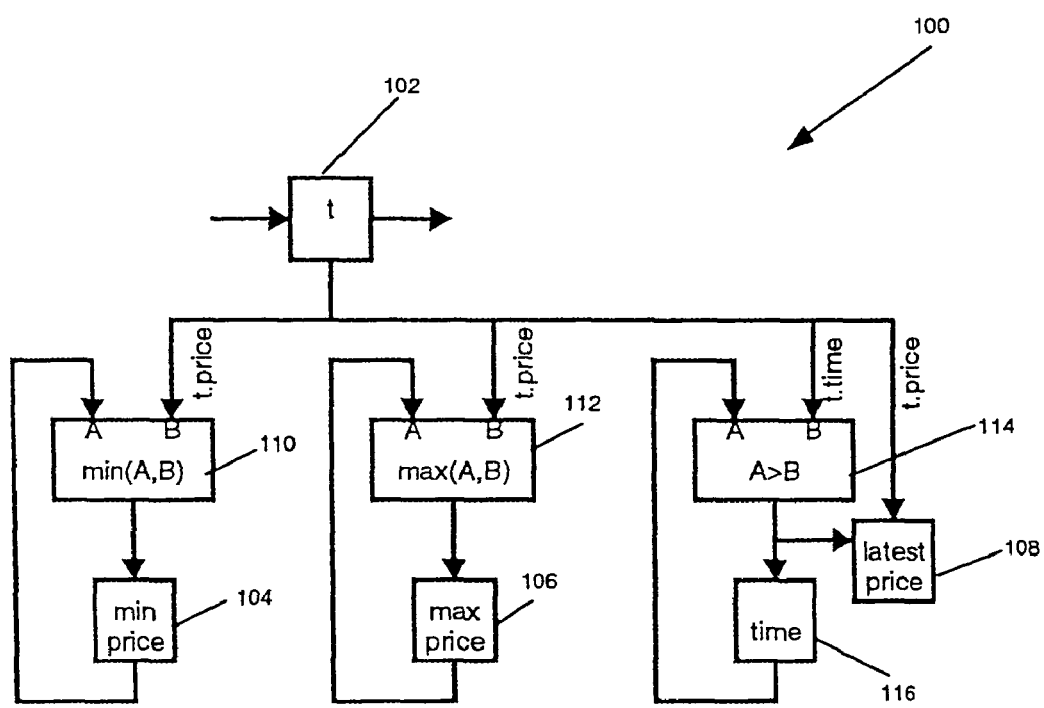
FIG. 27 is a block diagram showing an example using the present invention for performing data reduction operations.

While data reduction searching has been described with respect to the very simple financial example shown in FIG. 27, it can be appreciated that the present invention can perform data reduction searching for a variety of different applications of varying complexity requiring such functionality. The re-configurable logic device need simply be configured with the hardware and/or software to perform the necessary functions The ability to perform data reduction searching at disk rotational speeds cannot be under-estimated. One of the most valuable aspects of information is its timeliness. People are growing to expect things at Internet speed. Companies that can quickly compute aggregate data reductions will clearly have a competitive advantage over those that cannot.

Various changes and modifications to the present invention would be apparent to those skilled in the art but yet which would not depart from the spirit of the invention. The preferred embodiment describes an implementation of the invention but this description is intended to be merely illustrative. Several alternatives have been also been above. For example, all of the operations exemplified by the analog processing have their equivalent counterparts in the digital domain. Thus, approximate matching and correlation types of processing can be done on the standard digital representation of the analog bit patterns. This can also be achieved in a continuous fashion using tailored digital logic, microprocessors and digital signal processors, or alternative combinations. It is therefore the inventors' intention that the present invention be limited solely by the scope of the claims appended hereto, and their legal equivalents.

What is claimed is:

1. A system for accelerated data reduction with respect to financial information, the system comprising:
    at least one field programmable gate array (FPGA) having a hardware template deployed thereon for configuring the FPGA to perform a data reduction operation on streaming financial information, the hardware template deployed on the FPGA defining matching hardware logic and downstream summarization hardware logic that are resident on the FPGA;
    wherein the matching hardware logic comprises a first data register configured to store a data key, and wherein the matching hardware logic is configured to (1) receive a stream of financial information, the financial information comprising a plurality of stock symbols and their associated stock prices, each stock price having an associated time, and (2) match the financial information against the data key to find matched data within the financial information, wherein the matched data comprises a plurality of stock prices and times for a stock;
    wherein the summarization hardware logic comprises:
    a data shift register, wherein the FPGA is further configured to stream the stock prices and times within the matched data through the data shift register;
    a second data register configured to store a most recent minimum stock price for the stock of the matched data;
    a third data register configured to store a most recent maximum stock price for the stock of the matched data;
    a fourth data register configured to store a most recent latest stock price for the stock of the matched data;
    a fifth data register configured to store a most recent time;
    a first comparator;
    a second comparator; and
    a third comparator;
    wherein the first comparator is configured to, as the stock prices and times stream through the data shift register, compare a current stock price in the data shift register with the stored most recent minimum stock price to determine which is lower; and
    wherein the summarization hardware logic is further configured to update the stored most recent minimum stock price in the first data register with the current stock price in response to a determination by the first comparator that the current stock price is lower;
    wherein the second comparator is configured to, as the stock prices and times stream through the data shift register, compare the current stock price in the data shift register with the stored most recent maximum stock price to determine which is higher;
    wherein the summarization hardware logic is further configured to update the stored most recent maximum stock price in the second data register with the current stock price in response to a determination by the second comparator that the current stock price is higher;
    wherein the third comparator is configured to, as the stock prices and times stream through the data shift register, compare the current time in the data shift register with the stored most recent time to determine which is later;
    wherein the summarization hardware logic is further configured to update the stored most recent latest stock price in the third data register with the current stock price in the data shift register in response to a determination by the third comparator that the current time is later;
    wherein the first, second, and third comparators are in a parallel orientation such that the first, second, and third comparators operate simultaneously with each other; and wherein the matching hardware logic and the summarization hardware logic are configured in a pipelined orientation such that the matching hardware logic and the summarization hardware logic operate simultaneously with each other, the summarization hardware logic being configured to operate on matched data previously found by the matching hardware logic while the matching hardware logic is configured to operate on new streaming financial information, the matching hardware logic and the summarization hardware logic thereby being configured to simultaneously operate together to generate a running computation of the minimum price, the maximum price, and the latest price for the stock prices within the matched data on a streaming basis as the financial information streams through the FPGA.

2. The system of claim 1 wherein the matching hardware logic is further configured to perform an exact match operation between the stream of financial information and the data key such that the matched data comprises exactly matched data.

3. The system of claim 1 wherein the matching hardware logic is further configured to perform the match operation on a frame-by-frame basis.

4. The system of claim 1 wherein the matching hardware logic is further configured to perform the match operation on a frameless basis.

5. The system of claim 1 wherein the matching hardware logic is further configured to perform an approximate match operation between the stream of financial information and the data key such that the matched data comprises approximately matched data.

6. The system of claim 1 further comprising a network interface, the network interface for receiving the hardware template from a remote source via a network.

7. The system of claim 1 wherein the matching hardware logic and the summarization hardware logic are configured to operate at hardware processing speeds.

8. The system of claim 1 further comprising:
    at least one data storage device in communication with the FPGA, the at least one data storage device being configured to at least temporarily store the financial information; and
    wherein the FPGA is further configured to read the financial information from the at least one data storage device to thereby receive the financial information stream.

9. The system of claim 8 wherein the at least one data storage device comprises a mass storage medium.

10. The system of claim 1 wherein the first data register comprises a plurality of cells configured to store elements of the data key, and wherein the matching hardware logic further comprises:

a second data shift register, the second data shift register having a plurality of cells configured to store elements of the streaming financial information, wherein each second data shift register cell has a corresponding first data register cell;

a fine-grained comparison logic device, the fine-grained comparison logic device being configured to perform an element-by-element comparison as between the financial information elements and data key elements stored within corresponding ones of the second data shift register cells and first data register cells; and word-level comparison logic, the word-level comparison logic being configured to find the matched data based on the element-by-element comparison from the fine-grained comparison logic device; and wherein the second data shift register is configured to continuously shift elements of the financial information from one second data shift register cell to the next.

11. The system of claim 10 wherein the fine-grained comparison logic device comprises a plurality of cells, each fine-grained comparison logic cell being in communication with a first data register cell and at least one second data shift register cell, and wherein the matching hardware logic is further configured to route financial information elements from at least one of the second data shift register cells to a plurality of different fine-grained comparison logic cells as the elements of the streaming financial information shift from one cell to the next within the second data shift register to thereby support approximate matching.

12. The system of claim 1 further comprising a memory for storing the hardware template, wherein the FPGA is configured to receive the hardware template from the memory for loading onto the FPGA to thereby configure the FPGA for performing the data reduction operation on streaming financial information.

13. The system of claim 12 further comprising:
a processor that is in communication with the FPGA, wherein the processor is configured to execute a software program, the software program being configured to transform an inquiry into the hardware template and communicate the hardware template to the memory for loading onto the FPGA.

14. The system of claim 13 further comprising:
a system bus, wherein the FPGA is in communication with the system bus; and
wherein the processor is in communication with the FPGA via the system bus; and
wherein the FPGA is further configured to provide the computed minimum, maximum and latest stock prices to the system bus for access by the processor.

15. The system of claim 13 further comprising:
a cache, wherein the FPGA is in communication with the cache; and
wherein the processor is in communication with the cache; and
wherein the FPGA is further configured to provide the computed minimum, maximum and latest stock prices to the cache for access by the processor.

16. The system of claim 13 wherein the hardware template is configured to support a plurality of different word matches for the matching hardware logic without requiring that a new hardware template be loaded onto the FPGA, and wherein the software program is further configured to determine a new data key and communicate the new data key to the FPGA for loading into the first data register to thereby modify the matching hardware logic to search for the new data key within the streaming financial information.

17. The system of claim 13 wherein the memory is configured to store a plurality of pre-compiled hardware templates, each pre-compiled hardware template defining a different data processing operation to be performed by the FPGA, wherein at least one of the pre-compiled hardware templates comprises the hardware template for performing the data reduction operation on streaming financial information; and
wherein the software program is further configured to, in response to the inquiry processing, select one of the stored pre-compiled hardware templates for communication from the memory to the FPGA to thereby transform the FPGA to perform the data processing operation defined by the selected pre-compiled hardware template.

18. A method for accelerated data reduction with respect to financial information, the method comprising:
receiving, by at least one field programmable gate array (FPGA), streaming financial information, the financial information comprising a plurality of stock symbols and their associated stock prices, each stock price having an associated time, the FPGA having a hardware template deployed thereon that configures the FPGA to perform a data reduction operation on streaming financial information, the hardware template deployed on the FPGA defining matching hardware logic and downstream summarization hardware logic that are resident on the FPGA;

storing a data key in a first data register, the first data register being a part of the matching hardware logic;
matching the financial information against the data key to find matched data within the financial information, wherein the matched data comprises a plurality of stock prices and times for a stock, the matching step being performed by the matching hardware logic;
streaming the stock prices and times within the matched data through a data shift register, the data shift register being a part of the summarization hardware logic;
storing a most recent minimum stock price for the stock of the matched data in a second data register;
storing a most recent maximum stock price for the stock of the matched data in a third data register;
storing a most recent latest stock price for the stock of the matched data in a fourth data register;
storing a most recent time in a fifth data register; and
as the stock prices and times stream through the data shift register, (i) comparing a current stock price in the data shift register with the stored most recent minimum stock price to determine which is lower using a first comparator, the first comparator being a part of the summarization hardware logic, (ii) updating the stored most recent minimum stock price with the current stock price if the minimum price comparing step results in a determination that the current stock price is lower, (iii) comparing the current stock price in the data shift register with the stored most recent maximum stock price to determine which is higher using a second comparator, the second comparator being a part of the summarization hardware logic, (iv) updating the stored most recent maximum stock price with the current stock price if the maximum price comparing step results in a determination that the current stock price is higher, (v) comparing a current time in the data shift register with the stored most recent time to determine which is later using a third comparator, the third comparator being a part of the summarization hardware logic, and (vi) updating the stored most recent latest stock price with the current stock price in the data shift register if the latest price comparing step results in a determination that the current time is later;

wherein the first, second, and third comparators are in a parallel orientation such that the minimum price comparing step, the maximum price comparing step, and the latest price comparing step operate simultaneously with respect to each other; and wherein the matching hardware logic and the summarization hardware logic are configured in a pipelined orientation such that the matching step and the comparing steps are performed simultaneously with each other, the comparing steps operating on matched data previously found by the matching step while the matching step operates on new streaming financial information, the matching hardware logic and the summarization hardware logic thereby operating together simultaneously to generate a running computation of the minimum price, the maximum price, and the latest price for the stock prices within the matched data on a streaming basis as the financial information streams through the FPGA.

19. The method of claim 18 wherein the matching step comprises the matching hardware logic performing an exact match operation between the streaming financial information and the data key such that the matched data comprises exactly matched data.

20. The method of claim 18 wherein the matching step comprises the matching hardware logic performing the matching step on a frame-by-frame basis.

21. The method of claim 18 wherein the matching step comprises the matching hardware logic performing the matching step on a frameless basis.

22. The method of claim 18 wherein the matching step comprises the matching hardware logic performing an approximate match operation between the streaming financial information and the data key such that the matched data comprises approximately matched data.

23. The method of claim 18 further comprising:
a network interface receiving the hardware template from a remote source via a network; and
loading the received hardware template onto the FPGA to thereby configure the FPGA for performing the data reduction operation on streaming financial information.

24. The method of claim 18 wherein the FPGA performs the method steps at hardware processing speeds.

25. The method of claim 18 wherein the receiving step comprises:
the FPGA reading the financial information from a data storage device to thereby receive the stream of financial information.

26. The method of claim 25 wherein the data storage device comprises a mass storage medium.

27. The method of claim 18 further comprising:
loading the data key into the first data register, the first data register having a plurality of cells in which elements of the data key are stored;
the FPGA (i) loading the streaming financial information into a second data shift register, the second data shift register being a part of the matching hardware logic, the second data shift register having a plurality of cells in which elements of the streaming financial information are stored, wherein each second data shift register cell has a corresponding first data register cell, and (ii) streaming the financial information elements through the second data shift register cells;
wherein the matching step comprises the matching hardware logic (i) performing an element-by-element comparison as between the financial information elements and data key elements stored within corresponding ones of the second data shift register cells and the first data register cells using a fine-grained comparison logic device, the fine-grained comparison logic device being a part of the matching hardware logic, and (ii) responsive to the comparison by the fine-grained comparison logic device, finding the matched data using word-level comparison logic, the word-level comparison logic device being a part of the matching hardware logic; and
wherein the matching hardware logic performs the matching step continuously as the elements of the streaming financial information shift from one cell to the next within the second data shift register.

28. The method of claim 27 wherein the fine-grained comparison logic device comprises a plurality of cells, each fine-grained comparison logic cell being in communication with a first data register cell and at least one second data shift register cell, and wherein the matching step comprises the matching hardware logic routing financial information elements from at least one of the second data shift register cells to a plurality of different fine-grained comparison logic cells as the elements of the streaming financial information shift from one cell to the next within the second data shift register to thereby support approximate matching.

29. The method of claim 18 further comprising:
storing the hardware template in a memory;
the FPGA receiving the hardware template from the memory; and
loading the received hardware template onto the FPGA to thereby configure the FPGA for performing the data reduction operation on streaming financial information.

30. The method of claim 29 further comprising:
executing a software program on a processor that is in communication with the FPGA, wherein the executing step comprises the processor processing an inquiry to transform the inquiry into the hardware template;
communicating the hardware template to the memory; and
loading the communicated hardware template from the memory onto the FPGA.

31. The method of claim 30 further comprising:
the FPGA communicating the computed minimum, maximum and latest stock prices to a system bus; and
reading the communicated minimum, maximum and latest stock prices with a processor from the system bus.

32. The method of claim 30 further comprising:
the FPGA communicating the computed minimum, maximum and latest stock prices to a cache; and
reading the communicated minimum, maximum and latest stock prices with a processor from the cache.

33. The method of claim 30 wherein the hardware template is configured to support a plurality of different word matches for the matching step without requiring that a new hardware template be loaded onto the FPGA, wherein the executing step comprises the processor processing an inquiry to determine a new data key, the method further comprising:
communicating the new data key to the FPGA; and
loading the new data key into the first data register to thereby modify the matching step to search for the new data key within the streaming financial information.

34. The method of claim 30 further comprising:
storing a plurality of pre-compiled hardware templates in the memory, each pre-compiled hardware template defining a different data processing operation to be performed by the FPGA, wherein at least one of the pre-compiled hardware templates comprises the hardware template for performing the data reduction operation on the streaming financial information; and wherein the executing step comprises the processor processing an inquiry to select one of the stored pre-compiled hardware templates for communication from the memory to the FPGA to thereby transform the FPGA to perform the data processing operation defined by the selected pre-compiled hardware template.

\* \* \* \* \*